US006996563B2

(12) United States Patent
Kumagai et al.

(10) Patent No.: US 6,996,563 B2
(45) Date of Patent: Feb. 7, 2006

(54) COMMUNICATION SYSTEM, COMMUNICATION METHOD, DISTRIBUTION APPARATUS, DISTRIBUTION METHOD AND TERMINAL APPARATUS

(75) Inventors: Takashi Kumagai, Tokyo (JP); Izuru Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 303 days.

(21) Appl. No.: 09/829,239

(22) Filed: Apr. 9, 2001

(65) Prior Publication Data

US 2002/0059237 A1    May 16, 2002

(30) Foreign Application Priority Data

Apr. 11, 2000  (JP)  ............................ P2000-115775

(51) Int. Cl.
G06F 17/30    (2006.01)
(52) U.S. Cl. .................. 707/10; 709/203; 709/219; 709/247; 709/231; 711/202; 705/51
(58) Field of Classification Search ................. 707/10; 709/203, 219, 247, 231; 711/202; 705/51, 705/52; 7/52
See application file for complete search history.

(56) References Cited

U.S. PATENT DOCUMENTS

| 5,117,350 A | * | 5/1992 | Parrish et al. ................. 711/1 |
| 5,567,847 A | * | 10/1996 | Inoue ......................... 709/203 |
| 5,610,841 A | | 3/1997 | Tanaka et al. ............... 364/514 |
| 5,724,575 A | | 3/1998 | Hoover et al. .............. 395/610 |
| 5,771,354 A | * | 6/1998 | Crawford .................... 709/229 |
| 5,956,488 A | | 9/1999 | Suzuki .................. 395/200.49 |
| 6,154,744 A | * | 11/2000 | Kenner et al. ................ 707/10 |
| 6,385,596 B1 | * | 5/2002 | Wiser et al. .................. 705/51 |
| 6,430,620 B1 | * | 8/2002 | Omura et al. ............... 709/231 |
| 6,460,076 B1 | * | 10/2002 | Srinivasan .................. 709/219 |
| 6,594,675 B1 | * | 7/2003 | Schneider ................... 707/200 |

FOREIGN PATENT DOCUMENTS

WO        9641285        12/1996

OTHER PUBLICATIONS

Judd Robbins, Mastering DOS The Complete Tutorial and Up-to-Date User's Guide, copyright 1998 SYBEX Inc., New & Expanded Edition, pp. 96-125.*

* cited by examiner

Primary Examiner—Jeffrey Gaffin
Assistant Examiner—Hung Pham
(74) Attorney, Agent, or Firm—Jay H. Maioli

(57) ABSTRACT

A communication system includes a first storage section for storing pieces of content information, a second storage section for also storing pieces of content information, a control section for accessing the content information stored in the first storage section and the second storage section based on a single set of management information for managing the content information stored in the first storage section and the second storage section, a communication section for interconnecting the first storage section, the second storage section and the control section for communication, and an account setting section for setting an amount of a fee to be imposed on a predetermined user in response to use of the first storage section or the second storage section.

3 Claims, 14 Drawing Sheets

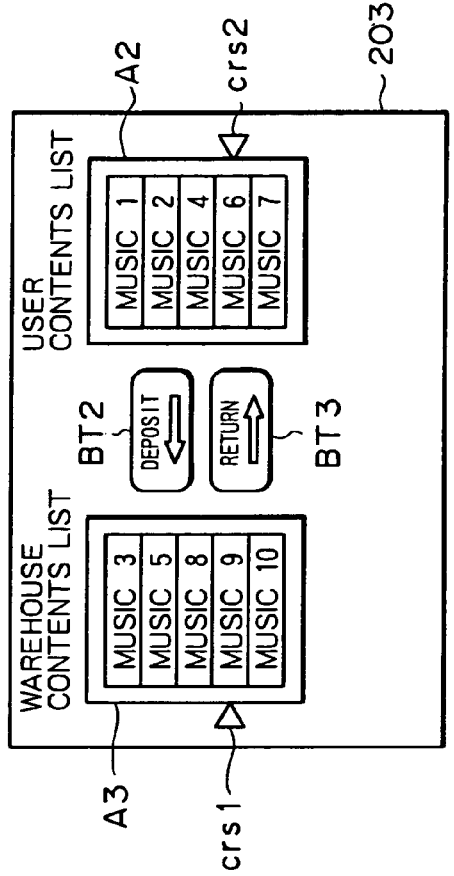
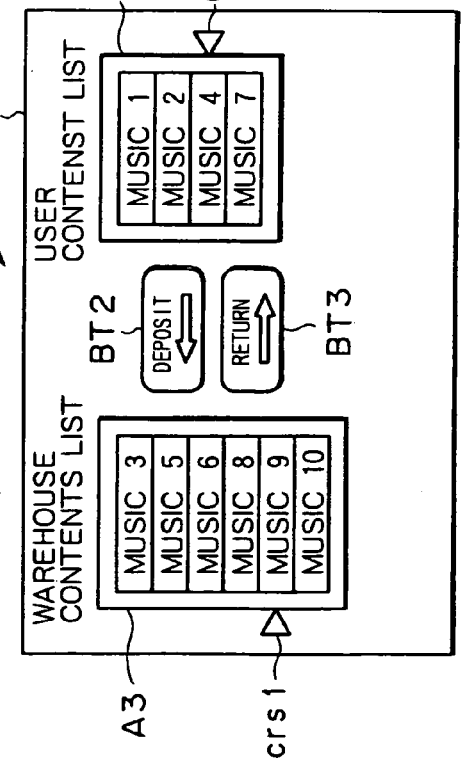
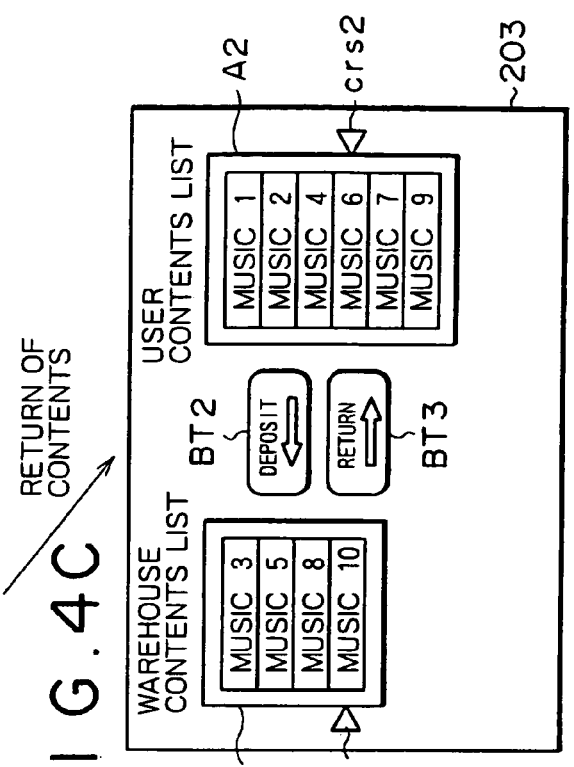

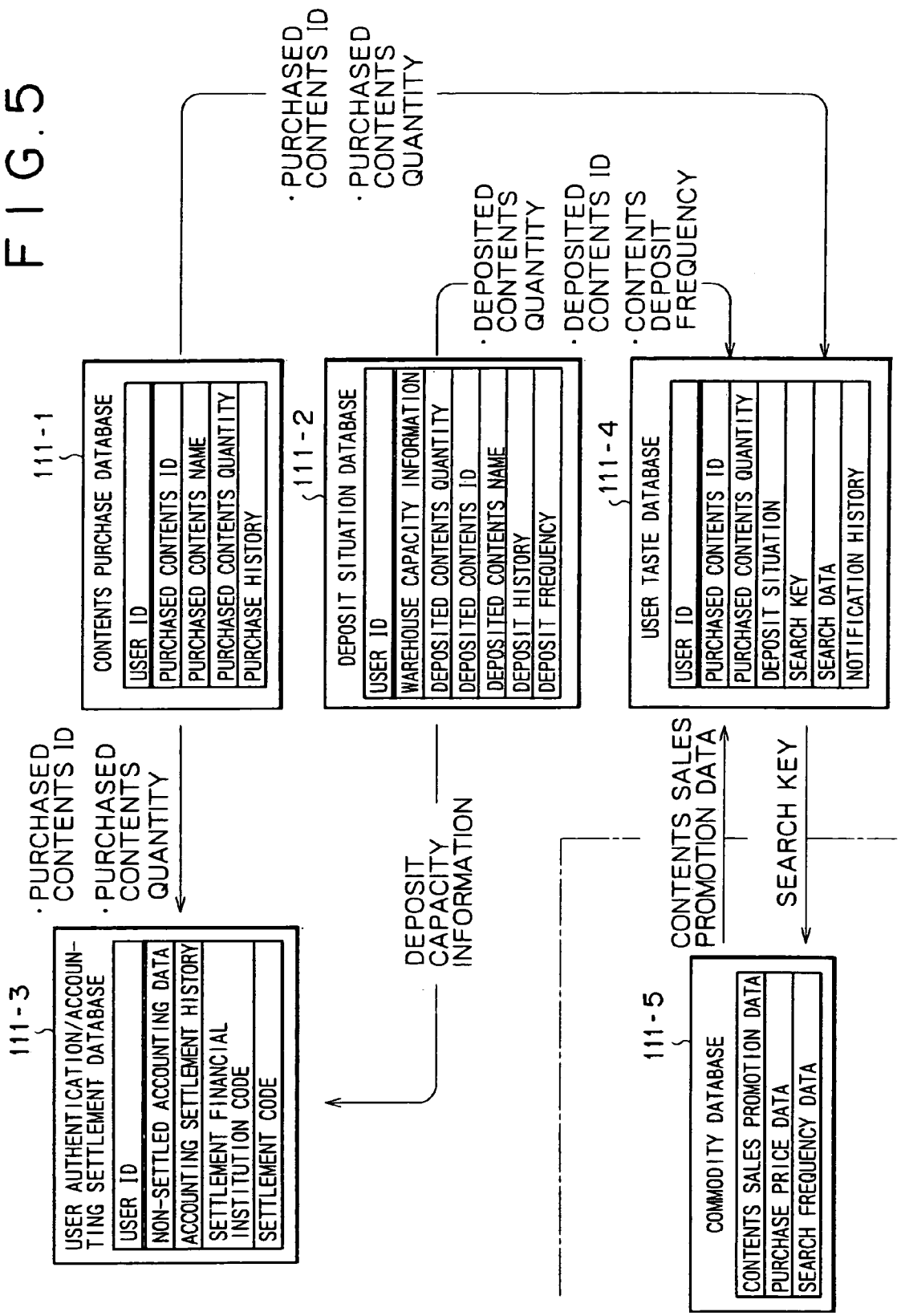

CONTENTS (TUNERIGHT)
PURCHASE PROCESS

CONTENTS RETURN PROCESS

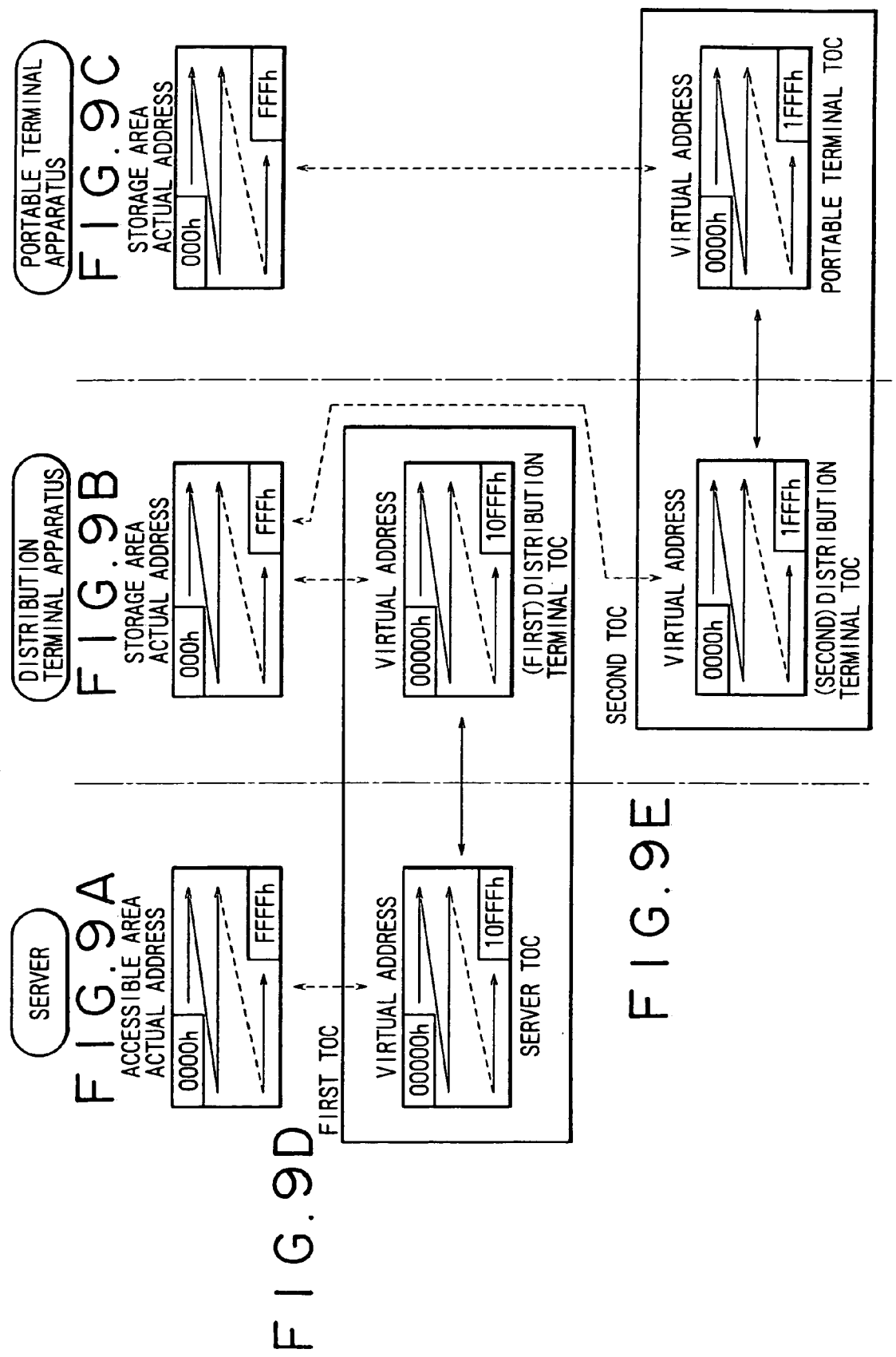

FIG. 10

STRUCTURE OF FIRST TOC

| USER ID | | | |
|---|---|---|---|
| SERVER ID | | DISTRIBUTION TERMINAL ID | |
| CONTENTS ID | VIRTUAL ADDRESS | CONTENTS ID | VIRTUAL ADDRESS |
| CONTENTS ID | VIRTUAL ADDRESS | CONTENTS ID | VIRTUAL ADDRESS |
| CONTENTS ID | VIRTUAL ADDRESS | CONTENTS ID | VIRTUAL ADDRESS |
| | | | |
| CONTENTS ID | VIRTUAL ADDRESS | CONTENTS ID | VIRTUAL ADDRESS |

⎵SERVER TOC   ⎵(FIRST) DISTRIBUTION TERMINAL TOC

FIG. 11

STRUCTURE OF SECOND TOC

| USER ID | | | |
|---|---|---|---|
| DISTRIBUTION TERMINAL ID | | PORTABLE TERMINAL ID | |
| CONTENTS ID | VIRTUAL ADDRESS | CONTENTS ID | VIRTUAL ADDRESS |
| CONTENTS ID | VIRTUAL ADDRESS | CONTENTS ID | VIRTUAL ADDRESS |
| CONTENTS ID | VIRTUAL ADDRESS | CONTENTS ID | VIRTUAL ADDRESS |
| | | | |
| CONTENTS ID | VIRTUAL ADDRESS | CONTENTS ID | VIRTUAL ADDRESS |

⎵(SECOND) DISTRIBUTION TERMINAL TOC   ⎵PORTABLE TERMINAL TOC

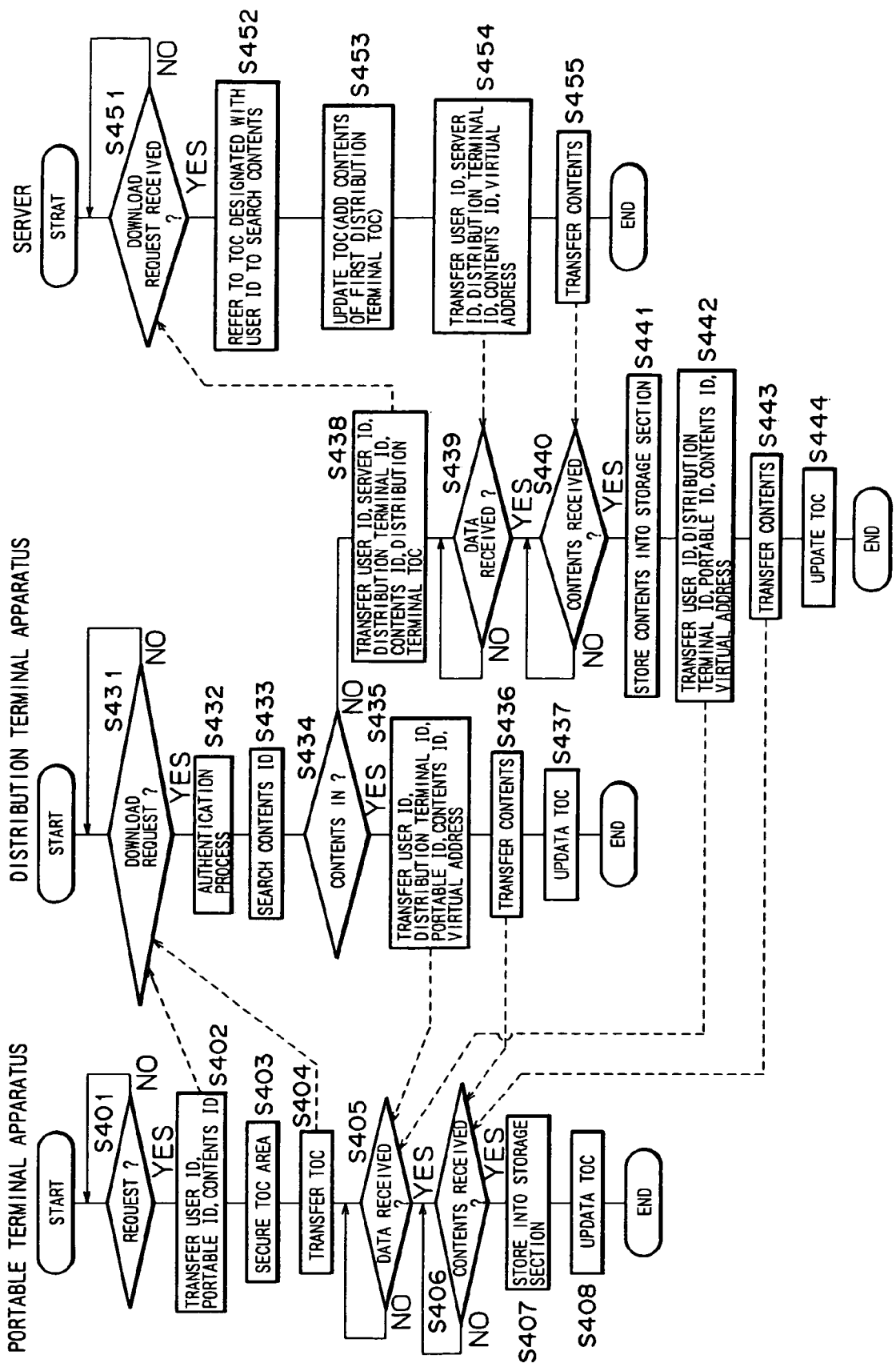

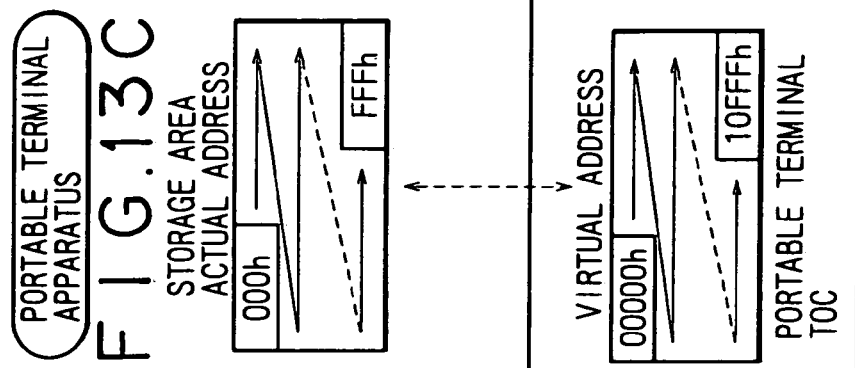
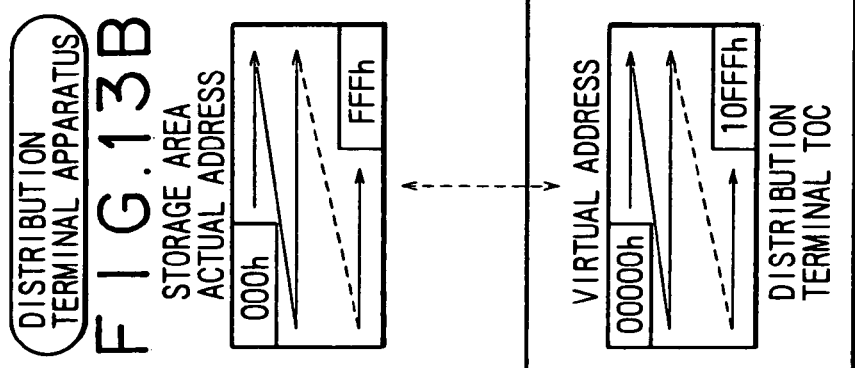
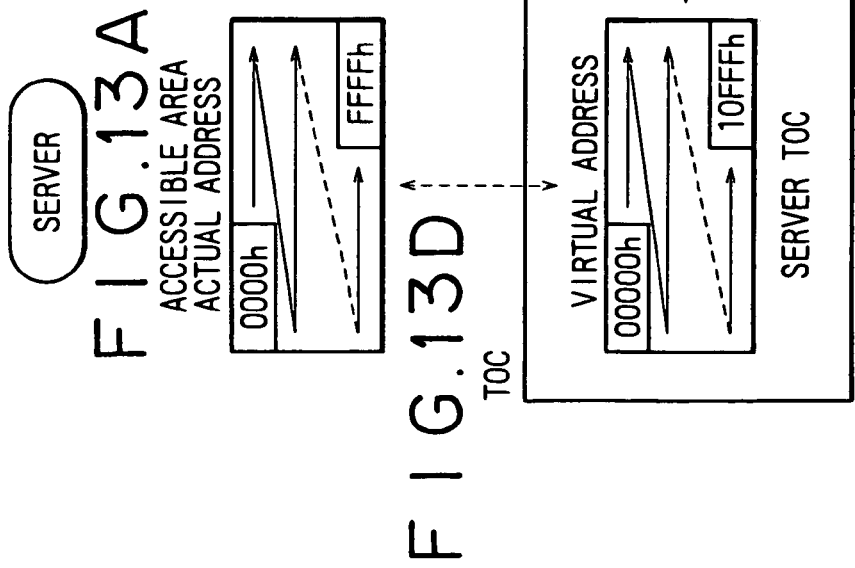

F I G. 14

STRUCTURE OF TOC

| USER ID | | | | | | | | | | |
|---|---|---|---|---|---|---|---|---|---|---|
| SERVER ID | | | | DISTRIBUTION TERMINAL ID | | | | PORTABLE TERMINAL ID | | |
| CONTENTS ID | VIRTUAL ADDRESS | ... | CONTENTS ID | CONTENTS ID | VIRTUAL ADDRESS | ... | CONTENTS ID | CONTENTS ID | VIRTUAL ADDRESS | ... |
| CONTENTS ID | VIRTUAL ADDRESS | | | CONTENTS ID | VIRTUAL ADDRESS | | | CONTENTS ID | VIRTUAL ADDRESS | |
| CONTENTS ID | VIRTUAL ADDRESS | | | CONTENTS ID | VIRTUAL ADDRESS | | | CONTENTS ID | VIRTUAL ADDRESS | |
| | | | CONTENTS ID | VIRTUAL ADDRESS | | | CONTENTS ID | VIRTUAL ADDRESS | | |
| ⎣SERVER TOC | | | | ⎣DISTRIBUTION TERMINAL TOC | | | | ⎣PORTABLE TERMINAL TOC | | |

COMMUNICATION SYSTEM, COMMUNICATION METHOD, DISTRIBUTION APPARATUS, DISTRIBUTION METHOD AND TERMINAL APPARATUS

BACKGROUND OF THE INVENTION

This invention relates to a communication system, a communication method, a distribution apparatus, a distribution method and a terminal apparatus for principally distributing audio data such as, for example, music data.

In recent years, a data distribution service called EMD (Electronic Music Distribution) which makes use of a network such as, for example, the Internet or satellite broadcasting has been proposed and started.

In a system for the EMD, for example, the distribution undertaker side provides a server for storing audio data of tunes as contents data for distribution. Meanwhile, a personal user owns a recording medium or a personal terminal apparatus which functions as a playback apparatus having a built-in recording medium. The personal user typically concludes a purchasing contract of desired contents data with the server side and issues a downloading request to the server. In response to the downloading request, the server side performs accounting setting and performs uploading of the contents data of an object of the request. Finally, the tune data is recorded onto the recording medium owned by the user or onto the recording medium built in the personal terminal apparatus. In other words, as viewed from the user side, the purchased contents data is actually acquired successfully.

As things stand, the form of the purchasing contract of contents data in the EMD is so-called "purchase per download" wherein, when contents data is purchased (downloaded) in a unit of a tune, the purchase is established and no more contract remains. In other words, for example, if a user purchases and downloads certain contents data of only one tune, then a trade regarding provision of the contents data through downloading is performed. It is to be noted that, in the form of "purchase per download", the number of playback times, the playback period or the like is sometimes restricted depending upon the intention of the proprietor of the copyright or the like.

In the EMD in the form of "purchase per download" described above, accounting setting is performed, for example, for downloading of one contents data performed once by a user, and also the server side performs data management and user management in conformity with such a contract form as described above. Therefore, for example, such a disadvantage may possibly occur.

It is assumed that, for example, a user erases contents data purchased by downloading once by some operation miss or for some convenience' sake.

According to the form of the "purchase per download" described above, such a miss of the user side as just described is irrevocable. Accordingly, if the user wants the contents data erased once in this manner, then the user must purchase and download the contents data once again.

More particularly, it is assumed that, for example, although the user side downloads many contents data, since the capacity of a storage medium or a storage apparatus owned by the user is small, there remains no room in the capacity to store and keep downloaded contents data any more.

In this instance, the user cannot download new contents data unless the user selectively erases some of the downloaded and stored contents data. In other words, the user is urged to select the contents data downloaded by the user him/herself. Then, if the contents data erased at this time is required once again, then the user must still conclude a purchasing contract and download the contents data again.

In this manner, the form of the "purchase per download" at present provides a kind of inconvenience to users.

SUMMARY OF THE INVENTION

It is an object of the present invention to provide a communication system, a communication method, a distribution apparatus, a distribution method and a terminal apparatus by which a distribution service not merely of the form of the "purchase per download" but of another form wherein re-downloading of contents data, for example, erased by the user side is warranted can be provided.

In order to attain the object described above, according to an aspect of the present invention, there is provided a communication system, comprising first storage means for storing a plurality of pieces of contents information, second storage means for storing a plurality of pieces of contents information, control means for accessing the contents information stored in the first storage means and the second storage means based on a single set of management information for managing the contents information stored in the first storage means and the second storage means, communication means for interconnecting the first storage means, the second storage means and the control means for communication, and accounting setting means for setting an amount of money to be imposed on a predetermined user in response to use of the first storage means or the second storage means.

According to another aspect of the present invention, there is provided a communication method, comprising the steps of accessing contents information stored in first storage means and second storage means based on a single set of management information for managing the contents information stored in the first storage means and the second storage means, and setting an amount of money to be imposed on a user of the first storage means or the second storage means in response to a capacity of use of the first storage means or the second storage means by the user.

According to a further aspect of the present invention, there is provided a distribution apparatus, comprising storage means for storing a plurality of pieces of contents information, communication means for connecting the distribution apparatus for communication to an external apparatus, and control means for accessing the contents information stored in the storage means based on management information for managing the contents information stored in the storage means in response to a user request from the external apparatus, wherein the control means produces management information for each user in response to an access to the contents information in accordance with the user request and stores the produced management information into the storage means, the management information including at least an ID of the user and an address representative of a storage location of the contents information stored in the storage means.

According to a still further aspect of the present invention, there is provided a distribution method for distributing desired contents information in response to a user request, comprising the steps of accessing the contents information stored in storage means based on management information for managing the contents information stored in the storage means in response to a user request from an external apparatus, producing management information for each user in response to the access to the contents information, and transmitting the accessed contents information to the external apparatus, wherein the management information includes at least an ID of the user and an address representative of a storage location of the contents information stored in the storage means.

According to a yet further aspect of the present invention, there is provided a terminal apparatus for receiving contents information from a distribution apparatus, comprising storage means for storing a plurality of pieces of contents information, communication means for receiving a plurality of contents IDs stored in the distribution apparatus from the distribution apparatus and transmitting at least one contents ID to the distribution apparatus in response to a user request, and control means for controlling the communication means to transmit at least one contents ID to the distribution apparatus in response to a user request and storing addresses corresponding to the contents IDs received from the distribution apparatus into the storage means, wherein the control means controls the communication means to transmit the addresses stored in the storage means to the distribution apparatus when the terminal apparatus requests the distribution apparatus for contents information corresponding to the contents ID.

According to a yet further aspect of the present invention, there is provided a communication method for receiving contents information from a distribution apparatus, comprising the steps of receiving a plurality of contents IDs stored in the distribution apparatus from the distribution apparatus, transmitting at least one contents ID to the distribution apparatus in response to a user request, storing addresses corresponding to the contents IDs received from the distribution apparatus into storage means, and transmitting the addresses stored in the storage means to the distribution apparatus when a request to re-send the contents information corresponding to any of the contents IDs is issued.

According to the present invention, a terminal apparatus and a distribution apparatus side commonly have one management data with which contents data stored in both of the terminal apparatus and the distribution apparatus can be managed, and each of the terminal apparatus and the distribution apparatus can be accessed based on the management data. This signifies that accessing to contents in order to purchase contents data or the like is performed based on the management data, and therefore, for example, management of contents data transferred between the distribution apparatus and the terminal apparatus can be performed solely by the terminal apparatus side or the distribution apparatus side. Further, according to the present invention, accounting setting is performed in accordance with a storage capacity of a storage section of the distribution terminal apparatus which can be accessed by the terminal apparatus side. This signifies that, for example, an amount of money is imposed for a capacity of a virtual warehouse into which contents data whose right is purchased by a user is deposited. Consequently, for example, the distribution side can administrate a new data distribution business which cannot be obtained by distribution of contents according to the "purchase per download" till now. Also the user can use the distribution system in a highly convenient manner of utilization in that contents data purchased by the user him/herself is managed utilizing the warehouse.

Further, in the present invention, contents data designated from the terminal apparatus side can be downloaded in such a manner as to copy or move under the configuration described above. Accordingly, also upon downloading, an operation of designating contents to be downloaded or a like operation is facilitated since such accessing based on the management data as described above can be performed.

Further, although a distribution system sometimes requires an authentication process when an access request is received, according to the present invention, an authentication process based on the management data described above can be performed.

Further, when accounting setting is to be performed based on a capacity of use of the storage capacity of the distribution apparatus used by the terminal apparatus, an amount of money is imposed, for example, for a fixed capacity prescribed in accordance with a contract in advance. As an alternative, accounting setting may be performed in accordance with a capacity of use of the storage capacity which varies depending upon a result of accessing. In this manner, the accounting setting of the capacity of use has some degree of freedom, and an accounting rule which is appropriate, for example, for the administration of the distribution system or the convenience to the user can be set.

Furthermore, according to the present invention, a system by which not contents data is traded by the "purchase per download" but a right of contents data is traded is constructed, and the user can access the distribution apparatus side based on the right to download the contents data again and conversely deposit the contents data to the distribution apparatus side. Thus, for example, if the storage capacity of the user side is not sufficient and therefore the user erases, for example, certain contents data, only if the right of the contents data is kept, then the user can receive supply of the contents data from the distribution apparatus side without purchasing the contents data newly. Consequently, a service which cannot be achieved by the "purchase per download" till now can be provided, and an advantage which cannot conventionally be enjoyed by the user can be anticipated. Together with this, new administration of accounting for management of rights (tune warehouse management) can be anticipated.

Where information of such purchase of rights of contents is possessed by the distribution apparatus side, even if, for example, the user of the terminal apparatus loses its contents data or right information of such contents data in error, if the distribution side apparatus is accessed from the user side, then it can restore the lost contents data or right, which raises the value of the service.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 4A to 4C are views, similar to FIGS. 3A and 3B, but showing different operation screens used to deposit and return contents data into and from a tune warehouse;

FIG. 5 is a diagrammatic view illustrating an example of configuration of databases provided in a server shown in FIG. 1;

FIGS. 9A to 9E are diagrammatic views illustrating a concept of a TOC in the data distribution system of FIG. 1;

FIG. 10 is a diagrammatic view illustrating an example of structure of a TOC (first TOC) in the data distribution system of FIG. 1;

FIG. 11 is view, similar to FIG. 10, but illustrating an example of structure of another TOC (second TOC) in the data distribution system of FIG. 1;

FIG. 12 is a flow chart illustrating processing operation between different component apparatus of the data distribution system of FIG. 1 principally in regard to accessing upon downloading of contents data based on the TOC;

FIGS. 13A to 13D are diagrammatic views illustrating a concept of another TOC;

FIG. 14 is a diagrammatic view illustrating another example of structure of a TOC.

DESCRIPTION OF THE PREFERRED EMBODIMENTS

In the following, embodiments of the present invention are described. The embodiments described below are formed as a data distribution system for distributing contents data principally including audio data of tunes.

The description proceeds in the following order.
1. Data Distribution System
1-1. General Configuration
1-2. Internal Configuration
1-3. Example of Utilization Form of Contents Distribution Service
1-4. Database Configuration of Server
2. Contents Purchasing Process
3. Contents Depositing Process
4. Contents Returning Process
5. Management Data of the Embodiment
5-1. Example of Management Data Structure
5-2. Example of Data Distribution Process Based on Management Data
6. Modifications
1. Data Distribution System
1-1. General Configuration FIG. 1 generally shows an example of construction of a data distribution system to which the present invention is applied.

Figure 1:
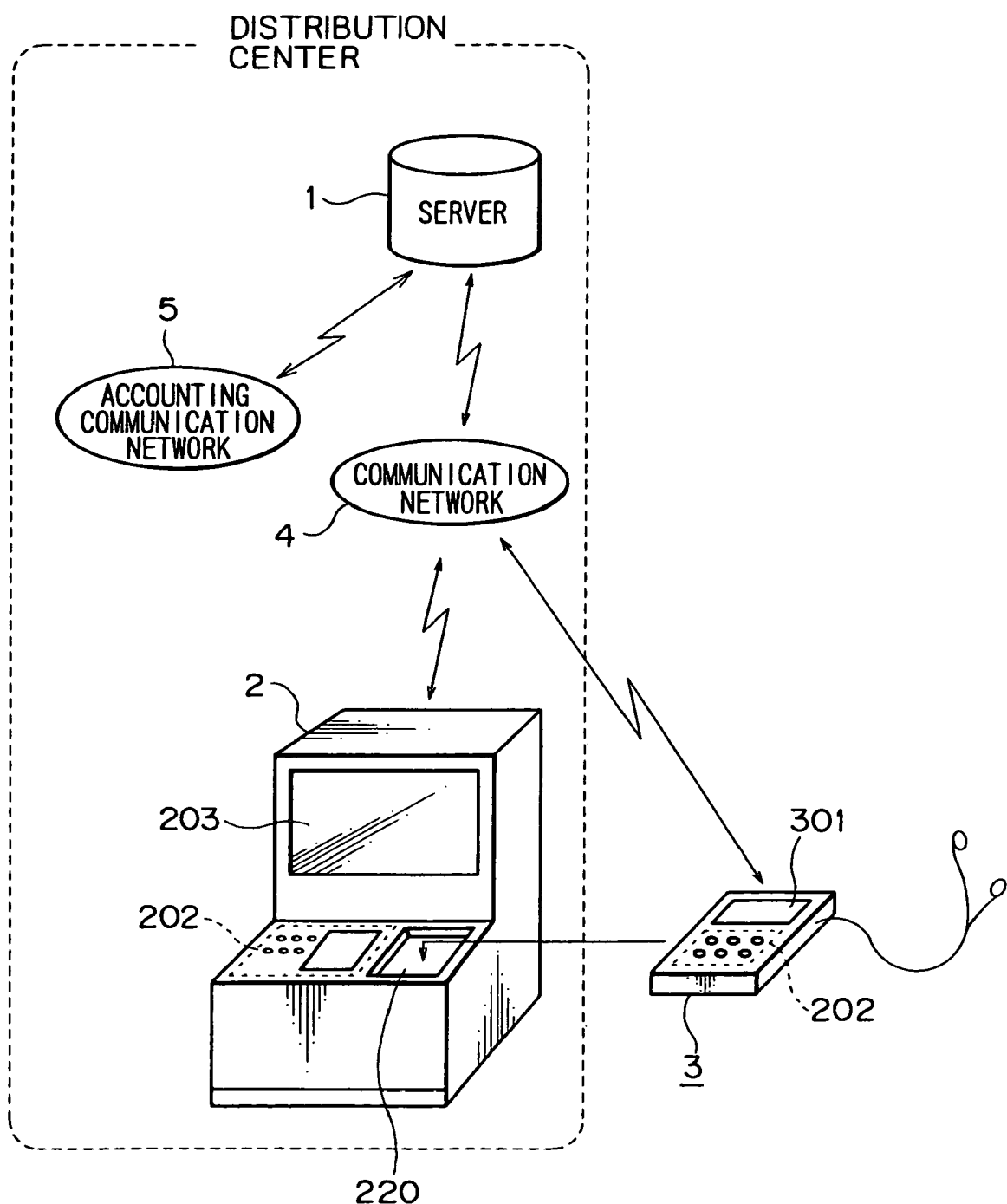
FIG. 1 is a schematic illustration showing an example of configuration of a data distribution system to which the present invention is applied.

Referring to FIG. 1, a server 1 includes a recording medium of a large capacity for storing contents data as distribution contents in such a manner as hereinafter described and has databases for managing a distribution situation of the contents data.

The contents data here typically are principally audio data of tunes and here are supplied typically from a record production company not shown. It is to be noted that the contents data may include, for example, in addition to tune data, text data or image data, for example, of the words or jackets relating to the tune data.

The server 1 is constructed for communication with a large number of distribution terminal apparatus 2 over a communication network 4. The server 1 transmits contents data to a distribution terminal apparatus 2 over the communication network 4. It is to be noted that, in the system configuration shown in FIG. 1, equipments wherein the distribution terminal apparatus 2 and the server 1 are connected for mutual communication are owned by the undertaker side which provides distribution services of contents data. In the following description, the equipments of the undertaker side are referred to as "distribution center".

It is to be noted that, in the present embodiment, a portable terminal apparatus 3 which is hereinafter described can perform communication directly with the server 1 to transmit and receive contents data without intervention of the distribution terminal apparatus 2.

Further, in the present embodiment, also it is possible to download contents data stored in the distribution center (server 1 and distribution terminal apparatus 2) side into the portable terminal apparatus 3 and to return contents data stored in the portable terminal apparatus 3 to the distribution center side while the acquired right of the contents data is maintained, that is, to "deposit" contents data whose right is owned by the user into the distribution center. When such processing regarding contents data as just described is performed, a charge is imposed on the user. To this end, in the present embodiment, an accounting communication network 5 is provided for collecting a charge from the user in accordance with an accounting process. The accounting communication network 5 is connected, for example, to a financial institution with which each user has concluded a contract to pay a charge for use of the information distribution system. Although the accounting communication network 5 is shown connected to the server 1, it may otherwise be connected to the communication network 4. In this instance, accounting regarding a situation of use of a distribution terminal apparatus 2 or a portable terminal apparatus 3 can be processed without intervention of the server 1.

Each of the distribution terminal apparatus 2 is actually located at a place where a user during moving can access the distribution terminal apparatus 2 readily such as, for example, a shop such as a convenience store or a drive-inn. The distribution terminal apparatus 2 has such a form as seen in FIG. 1 so that a portable terminal apparatus 3 can be mounted onto a mounting portion 220 and allows mutual communication with the thus mounted portable terminal apparatus 3.

Then, if a request to download contents data, for example, into the portable terminal apparatus 3 mounted on the distribution terminal apparatus 2 is issued, then the distribution terminal apparatus 2 can send the request to the server 1 so that the requested contents data is transferred from the server 1 and can transfer the received contents data to the portable terminal apparatus 3 so that the contents data are uploaded into the portable terminal apparatus 3. On the contrary, if a request to deposit contents data stored in the portable terminal apparatus 3 back into the distribution center side is issued, then the portable terminal apparatus 3 executes a process for the back deposition while it performs, for example, communication for cooperating with the server 1 if necessary.

It is to be noted that such requests regarding transfer of contents data described above can be generated, for example, by operating an operation section 302 provided on the portable terminal apparatus 3 or an operation section 202 provided on the distribution terminal apparatus 2. Further, when any of such operations is performed, contents corresponding to the operation are displayed on a display section 301 of the portable terminal apparatus 3 or a display section 203 of the distribution terminal apparatus 2.

The portable terminal apparatus 3 of the present embodiment can mutually communicate with the distribution terminal apparatus 2 when it is mounted on (connected to) the distribution terminal apparatus 2. The portable terminal apparatus 3 can further communicate with the server 1 through the distribution terminal apparatus 2. Thus, the portable terminal apparatus 3 stores information as contents data outputted from the distribution terminal apparatus 2 in such a manner as described above onto a predetermined type of recording medium built therein.

In this manner, the information distribution system of the present embodiment can realize so-called data on-demand that, from within a large amount of information stored in the server 1, information as contents data requested by the user of the portable terminal apparatus 3 can be downloaded onto the recording medium of the portable terminal apparatus 3.

It is to be noted that the communication network 4 described above is not particularly limited, and for example, an ISDN (Integrated Services Digital Network), a CATV (Cable Television Community Antenna Television), a communication satellite, a telephone network, wireless communication or the like can be utilized for the communication network 4.

Further, while, in the present embodiment, the storage medium is built in the portable terminal apparatus 3, alternatively a movable storage medium may be loaded in the portable terminal apparatus 3. Further, the type of the storage medium may be a magnetic disk such as a hard disk, an optical disk, a magneto-optical disk, or a memory (semiconductor memory, magnetic memory or optical memory). Further, where the storage medium is a semiconductor memory, it may be a smart media (trademark) having a flash memory built therein, a compact flash (trademark), a memory stick (trademark) having a flash memory and a memory controller built therein, or an SD card (trademark).

1-2. Internal Configuration

Figure 2:
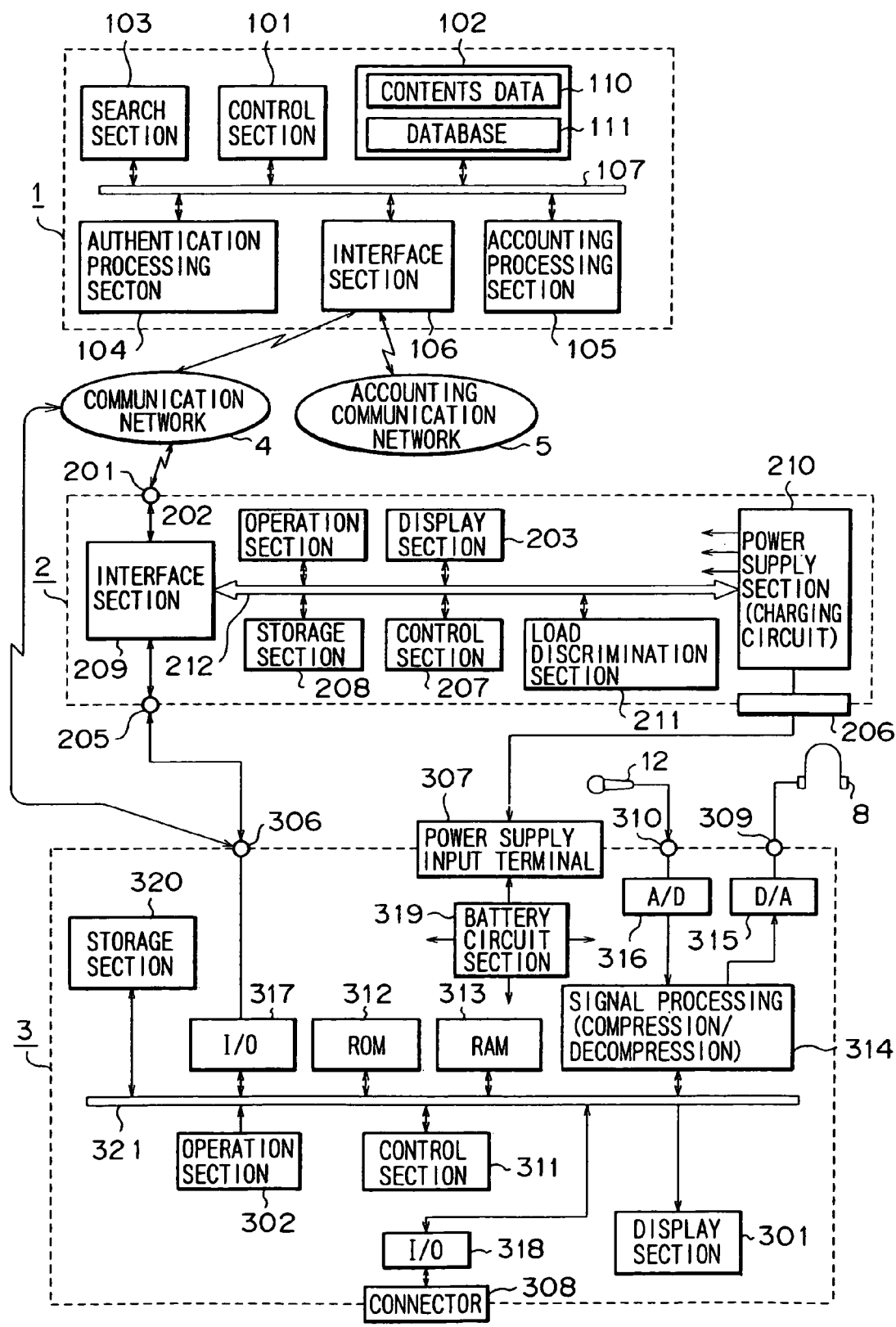
FIG. 2 is a block diagram showing an example of internal construction of several apparatus which form the data distribution system of FIG. 1.

FIG. 2 shows an internal configuration of the server 1, distribution terminal apparatus 2 and portable terminal apparatus 3 described hereinabove with reference to FIG. 1.

The server 1 is described first.

Referring to FIG. 2, the server 1 includes a control section 101, a storage section 102, a search section 103, an authentication processing section 104, an accounting processing section 105 and an interface section 106. The functioning circuit sections are connected for transmission/reception of data therebetween over a bus line 107.

The control section 101 includes, for example, a microcomputer and so forth and executes control of the functioning circuit sections of the server 1 in response to various kinds of information supplied thereto from the communication network 4 through the interface section 106.

The interface section 106 is provided for mutual communication with the distribution terminal apparatus 2 over the communication network 4. It is to be noted that the transmission protocol upon transmission may be a unique protocol or may be the TCP/IP (Transmission Control Protocol/Internet Protocol) which is universally used on the Internet or a like protocol by which data are transmitted in the form of a packet.

The search section 103 executes a process of searching for required data from data stored in the storage section 102 under the control of the control section 101. For example, the searching process is performed based on request data transmitted, for example, from the distribution terminal apparatus 2 and inputted to the control section 101 from the communication network 4 through the interface section 106.

The storage section 102 includes, for example, a recording medium of a large capacity, a driver apparatus for driving the recording medium and so forth and has a contents data storage area 110 into which contents data for distribution described hereinabove are stored. The storage section 102 further has a database storage area 111 into which required information beginning with information regarding users such as an ID (hereinafter referred to as "user ID") set for each user, that is, for each portable terminal apparatus 3, various kinds of information for managing contents data acquired as a right by each user and accounting setting information is stored as a database.

Here, although the recording medium adopted by the storage section 102 may possibly be a magnetic tape or the like which is used for broadcasting appliances at present, in order to implement the on-demand function which is one of characteristics of the present system, preferably a hard disk, an IC memory, an optical disk, a magneto-optical disk or a like medium which can be accessed at random is adopted.

Further, since it is necessary to record a large amount of data, preferably the data stored in the storage section 102 are digital compressed data. While various compression methods for audio data are available such as the ATRAC (Adaptive Transform Acoustic Coding), the ATRAC2, the ATRAC3, the TwinVQ (Transform domain Weighted Interleave Vector Quantization) (trademark), the MPEG-2AAC (Moving Picture Experts Group—2 Advanced Audio Coding) (trademark), the MP3 (MPEG-1 Audio Layer3) (trademark), and the MS Audio (WMA: Windows Media Audio) (trademark), the compression method is not particularly limited to a compression technique, for example, if decompression is possible on the distribution terminal apparatus side. Further, the compression method where video data are stored in the storage section 102 may be the MPEG4, the MPEG7, the JPEG, the JPEG200 or compression which uses wavelet transformation or the like.

The authentication processing section 104 performs comparison, for example, between a user ID transmitted thereto together with request data and user IDs (for example, stored in the database of the storage section 102) of the portable terminal apparatus 3 which can utilize the information distribution system of the present embodiment at present to authenticate whether or not the portable terminal apparatus 3 which has issued the request is a legal one, and outputs a result of the authentication process to the control section 101. The control section 101 sets based on the result of the authentication whether or not utilization of the distribution center by the portable terminal apparatus 3 should be permitted.

The accounting processing section 105 performs a process for imposing an amount of money in accordance with utilization of the information distribution system by the user who owns the portable terminal apparatus 3 under the control of the control section 101. For example, if requesting information for purchase of contents data is supplied from the distribution terminal apparatus 2 to the server 1 over the communication network 4, then the control section 101 communicates necessary information in response to the requesting information. In this instance, the control section 101 grasps an actual utilization situation based on the communicated information and controls so that an amount of money conforming to contents of the utilization may be set by the accounting processing section 105 in accordance with a predetermined rule.

Now, the distribution terminal apparatus 2 is described.

The distribution terminal apparatus 2 shown in FIG. 2 includes an operation section 202, a display section 203, a control section 207, a storage section 208, an interface section 209, a power supply section 210 (including, for example, a charging circuit), and a mounting discrimination section 211 which are connected to each other by a bus line 212.

The control section 207 includes a microcomputer and other necessary elements and controls operation of the functioning circuit sections in the distribution terminal apparatus 2 when necessary.

The interface section 209 is interposed between a communication control terminal 201 and an information input/output terminal 205 and allows mutual communication with the server 1 over the communication network 4 and mutual communication with the portable terminal apparatus 3. In other words, an environment wherein the server 1 and the portable terminal apparatus 3 can communicate with each other through the interface section 209 is obtained.

Also the storage section 208 in this instance can store a comparatively great amount of data so that, for example, contents data transferred once from the server 1 and downloaded in the portable terminal apparatus 3 can be stored in the storage section 208. Further, also management information regarding the portable terminal apparatus 3 and some databases obtained using the distribution terminal apparatus 2 can be stored in the storage section 208.

For example, if a request to download contents data is received from a portable terminal apparatus 3 connected to the distribution terminal apparatus 2, then if the contents data of an object of the request is stored already in the storage section 208, then downloading can be completed by data transfer between the distribution terminal apparatus 2 and the portable terminal apparatus 3 without accessing the server 1, and reduction of the time required for the downloading and reduction of the burden on the server 1 side can be achieved as much. Further, in this instance, if information regarding the portable terminal apparatus 3 owned by the user is stored in the distribution terminal apparatus 2, then it is not necessary to access the server 1 and further access the portable terminal apparatus 3 in order to obtain information of the user either.

The storage section 208 may include, for example, a memory so that required information transmitted from the server 1 or a portable terminal apparatus 3 can be temporarily stored. Writing and reading out control into and from the storage section 208 is executed by the control section 207.

The power supply section 210 includes, for example, a switching converter and so forth, and receives a commercial ac power supply not shown, produces a dc power supply of a predetermined voltage and supplies the dc power supply as an operating power supply to the functional circuit sections of the distribution terminal apparatus 2. The power supply section 210 includes a charging circuit for charging a battery built in the portable terminal apparatus 3 side and can thus supply charging power from a power supply terminal 206 to the portable terminal apparatus 3 through a power supply input terminal 307 of the portable terminal apparatus 3. In this instance, required operation of the power supply section 210 (and charging circuit) is controlled by the control section 207.

The mounting discrimination section 211 discriminates a mounted/non-mounted state of a portable terminal apparatus 3 on the mounting portion 220 of the distribution terminal apparatus 2. The mounting discrimination section 211 may include such a mechanism as, for example, a photo-interrupter or a mechanical switch or may detect a conducting state of a predetermined terminal included, for example, in the power supply terminal 206 or the information input/output terminal 205 which is established when the portable terminal apparatus 3 is mounted appropriately on the distribution terminal apparatus 2.

The operation section 202 includes operation means such as, for example, various keys and so forth or a touch panel, and information of an operation performed for the operation section 202 is supplied to the control section 207 over the bus line 212. The control section 207 executes required control processing suitably in response to the operation information supplied thereto.

The display section 203 is provided on the distribution terminal apparatus 2 in such a manner that it is exposed on the body of the distribution terminal apparatus 2 as described hereinabove with reference to FIG. 1 and includes a display device such as, for example, a liquid crystal display unit or a CRT (Cathode Ray Tube), a display driver section for the display device and so forth. Displaying operation of the display section 203 is controlled by the control section 207.

Now, the portable terminal apparatus 3 is described.

When the portable terminal apparatus 3 shown in FIG. 2 is mounted on a distribution terminal apparatus 2 in such a manner as described hereinabove with reference to FIG. 1, it is connected for communication of data with the distribution terminal apparatus 2 through the information input/output terminals 205 and 306, and charging power is supplied from the power supply section 210 of the distribution terminal apparatus 2 to the portable terminal apparatus 3 through the power supply terminal 206 and the power supply input terminal 307.

Further, in FIG. 2, the portable terminal apparatus 3 shown is constructed such that a control section 311, a ROM 312, a RAM 313, a signal processing section 314, a pair of I/O ports 317 and 318, a battery circuit section 319, a display section 301 and an operation section 302 are connected to each other by a bus line 321.

Also in this instance, the control section 311 includes a microcomputer and so forth and executes control of operation of the functioning sections in the portable terminal apparatus 3.

The ROM 312 stores, for example, program data and information of various databases and so forth necessary for the control section 311 to execute required control processing. The RAM 313 temporarily stores required data to be communicated with the distribution terminal apparatus 2 and data produced by processing of the control section 311.

The I/O port 317 is provided to allow mutual communication with the distribution terminal apparatus 2 (or the server 1) through an information input/output terminal 306. Information to be transmitted to or received from the portable terminal apparatus 3 and data to be downloaded are inputted and outputted through the I/O port 317.

A storage section 320 provided in the portable terminal apparatus 3 includes a driver for performing recording onto or playback from a predetermined recording medium and other necessary elements and is provided to store information downloaded from the server 1 through the distribution terminal apparatus 2.

It is to be noted that also the recording medium adopted by the storage section 320 is not limited to a particular one. However, also in this instance, where the random accessibility is taken into consideration, for example, a recording medium which adopts a memory element such as a flash memory or a recording medium which allows random accessing such as a hard disk or an optical disk is adopted preferably.

In the present embodiment, for example, data downloaded in accordance with a purchasing contract can be stored into the storage section 320. Of the data stored in the storage section 320, audio data can be played back by means of the portable terminal apparatus 3 and enjoyed. To this end, the portable terminal apparatus 3 includes the signal processing section 314.

The signal processing section 314 receives audio data typically read out from the storage section 320 over the bus line 321 and performs required signal processing for the audio data. Here, if the audio data stored in the storage section 320 are data obtained by predetermined encoding including compression processing in accordance with a predetermined form, then the signal processing section 314 performs predetermined decoding processing including decompression processing for the received compressed audio data and outputs resulting data to a D/A converter 315. The audio data converted into an analog audio signal by the D/A converter 315 is supplied to a headphone terminal 309. Here, if a headphone 8 is connected to the headphone terminal 309, then the played back downloaded data of a tune or the like can be outputted as sound to the outside.

The portable terminal apparatus 3 has a microphone terminal 310 provided thereon. For example, if a microphone 12 is connected to the microphone terminal 310 and sound is inputted to the microphone 12, then the sound signal is converted into a digital audio signal by an A/D converter 316 and inputted to the signal processing section 314.

In this instance, the signal processing section 314 operates so as to perform, for example, compression processing and required encoding processing suitable for data writing into the storage section 320 for the digital input signal inputted thereto. The data obtained by the encoding processing can be stored, for example, into the storage section 320 under the control of the control section 311.

The I/O port 318 is provided to allow inputting and outputting of a signal from and to an apparatus which is connected to the outside making use of a connector 308. The connector 308 allows connection thereto of, for example, a display apparatus, a keyboard, a modem, or a terminal adapter. This is described in more detail in connection with a form of utilization of the portable terminal apparatus 3 of the present embodiment.

The battery circuit section 319 provided in the portable terminal apparatus 3 at least includes a rechargeable battery and a power supply circuit which makes use of the power of the rechargeable battery to supply operating power to the functioning sections in the portable terminal apparatus 3.

Where the portable terminal apparatus 3 is mounted on and connected to the distribution terminal apparatus 2 through the power supply terminal 206 and the power supply input terminal 307, power supply in place of the rechargeable battery is outputted from the power supply section 210 of the distribution terminal apparatus 2 to the battery circuit section 319 of the portable terminal apparatus 3. Also charging current to the rechargeable battery can be supplied from the power supply section 210 to the battery circuit section 319.

The display section 301 and the operation section 302 of the portable terminal apparatus 3 shown in FIG. 2 are provided, for example, on a body of the portable terminal apparatus 3 as shown in FIG. 2, and also with the portable terminal apparatus 3, display control of the display section 301 is performed by the control section 311. Further, the control section 311 executes required control processing suitably based on operation information outputted from the operation section 302.

1-3. Database Configuration of Server

According to the data distribution system of the embodiment having the configuration described above, a user of a portable terminal apparatus 3 purchases contents data of a tune not by "purchase per download" but can purchase a right of contents data, for example, of each tune. The contents data whose right is owned by the user can be downloaded to the portable terminal apparatus 3 when the user wants. Also it is possible to conversely move contents data downloaded and stored in the portable terminal apparatus 3 apparently so as to be deposited to the distribution center side. In other words, the distribution center side performs data management in such a form that it receives and keeps contents data whose right is owned by a user. Then, if a request to return the contents data deposited to the distribution center side is issued from the portable terminal apparatus 3 side, then the contents data can be downloaded and stored into the portable terminal apparatus 3 again.

In other words, in the present embodiment, warehouse operation wherein a user having a right of contents data of a tune deposits the tune to its tune warehouse virtually provided on the server side or draws out the tune deposited to the tune warehouse is performed.

As a manner of accounting, for example, involved in this, for example, when the right is purchased, a price is set as a consideration for the right, and further, when the tune warehouse is utilized by the user, a price is set in accordance with such utilization situation to impose a charge.

Thus, a form of utilization of the data distribution system of the embodiment described above is described with reference to FIGS. 3A, 3B, 4A, 4B and 4C. It is to be noted that, in the following description, a case wherein a user makes use of a service of the distributions system of the present embodiment in such a form that a portable terminal apparatus 3 is mounted on a distribution terminal apparatus 2 is described as an example. Further, various operations to be executed by the user in this instance can be performed by operation of the operation section 202 provided on the distribution terminal apparatus 2.

As seen in FIGS. 3A, 3B, 4A, 4B and 4C, as display contents of the display section 203 of the distribution terminal apparatus 2 in accordance with an operation procedure of a user, lists of contents data of the distribution center side and the portable terminal apparatus 3 side are displayed in conformity with a utilization form. The display of such lists is possible even if, for example, the portable terminal apparatus 3 is not mounted on the distribution terminal apparatus 2 where management data are shared by the apparatus which construct the system in such a manner as hereinafter described. As an example, even if management data regarding contents data stored in the distribution terminal apparatus 2 is not read in and acquired by the portable terminal apparatus 3 side, the distribution terminal apparatus 2 can display lists of contents data of the distribution side and the portable terminal apparatus 3 side in such a manner as described below.

Figure 3A:
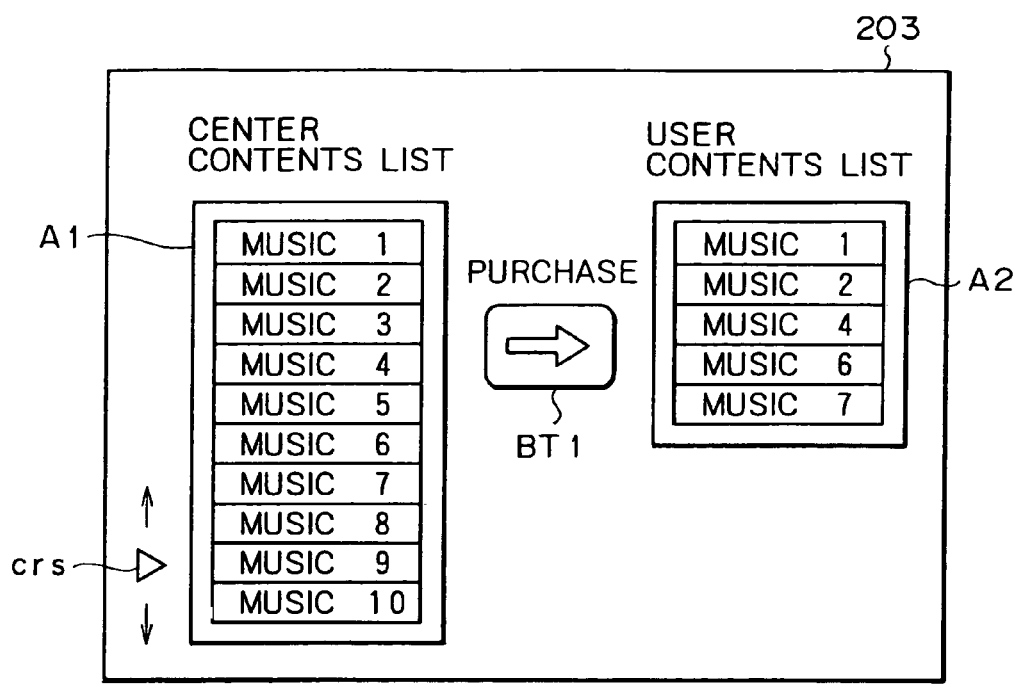
FIGS. 3A and 3B are schematic views illustrating an example of operation screen used to purchase contents data (a right of a tune)

Here, it is assumed that, for example, some user wants to purchase contents data of a desired tune newly. Thus, it is assumed that, for example, the user of the portable terminal apparatus 3 performs an operation for purchasing a right of the tune on the operation section 202 of the distribution terminal apparatus 2. Then, an operation screen for purchasing a right of a tune is displayed, for example, in such a manner as seen in FIG. 3A on the display section 203 of the distribution terminal apparatus 2. It is to be noted that, in this operation, for example, it is requested to input a user ID, and the user inputs its user ID, for example, by mounting the portable terminal apparatus 3 or performing a predetermined operation. Then, actually in a stage wherein, for example, authentication is obtained based on information of the user ID and so forth, the display shown in FIG. 3A is started. This similarly applies also when the operation screen of any of FIGS. 3B and 4A to 4C hereinafter described is displayed.

On the operation screen shown in FIG. 3A, a contents list A1 is shown on the left side. The contents list A1 indicates a list of contents data prepared by the distribution center side, that is, contents data which can be uploaded from the server 1, in a predetermined display form. In FIG. 3A, it is shown that a list of 10 contents data of Music 1 to Music 10 presented. It is to be noted that the number of tunes which can be provided by the distribution center side is actually very large, and actually part of the list of the data is displayed and the portion of the displayed list is changed by a predetermined operation.

Further, in FIG. 3A, a cursor crs is displayed on the left side of the contents list A1. The cursor crs is movable along the designations of the contents data displayed in the contents list A1 by a so-called GUI operation by the user to designate one of the contents data.

A user contents list A2 is displayed on the right side of the operation screen shown in FIG. 3A. In the user contents list A2, contents data currently stored in the portable terminal apparatus 3 mounted on the distribution terminal apparatus 2 are displayed as a list. In FIG. 3A, it is shown that contents data for five tunes of Music 1, Music 2, Music 4, Music 6 and Music 7 are stored in the portable terminal apparatus 3 owned by the user.

Between the contents list A1 and the user contents list A2, a purchase button BT1 which can be operated by a so-called GUI operation by a user is displayed.

In a state wherein the operation screen for purchasing is displayed in this manner, the user can discriminate those contents data which can be provided by the distribution side at present. The user can discriminate also contents data stored in the portable terminal apparatus 3 owned by the user him/herself.

In a state wherein such an operation screen for purchasing as described above is displayed, the user can perform a moving operation of the cursor crs to select contents data to be purchased by the user him/herself from among the titles of the contents data in the contents list A1. Here, it is assumed that the user selects the Music 9 in the contents list A1. Then, if the user operates the purchase button BT1, then the display screen changes to such a display screen as seen in FIG. 3B.

Figure 3B:
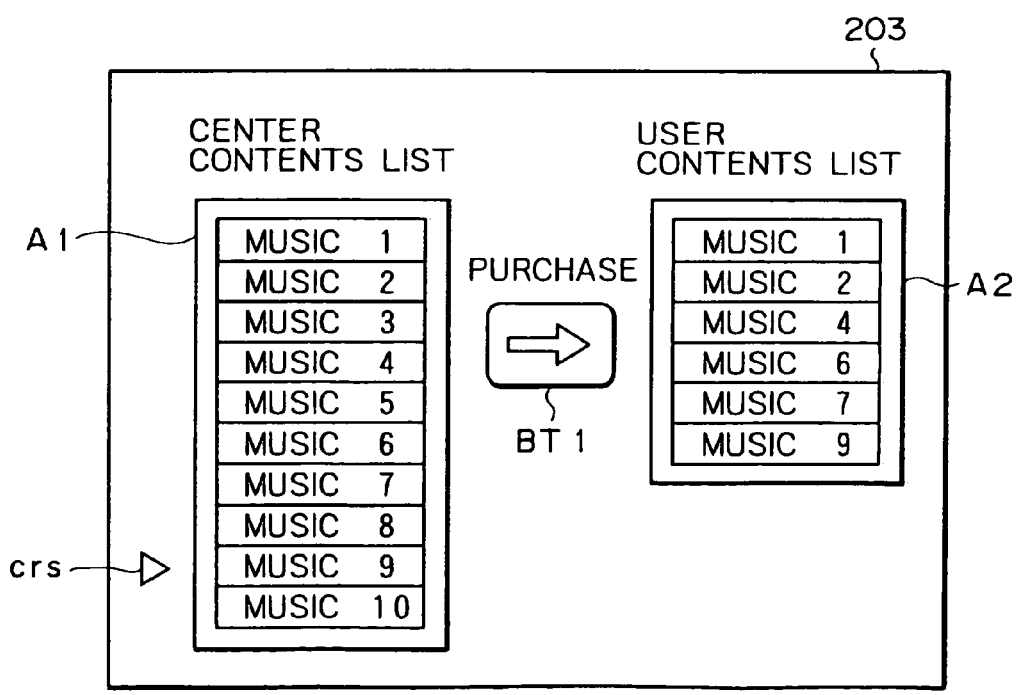

In FIG. 3B, the title of Music 9 whose purchase has been determined by the user is additionally displayed in the user contents list A2.

This indicates that, since the user has performed the operation for purchase determination of the Music 9, the contents data stored in the portable terminal apparatus 3 include the contents data of the Music 9 in addition to the contents data which have been stored till that time. In other words, it is indicated that the user has acquired a proprietary right of the contents data of the Music 9. Then, for example, if the portable terminal apparatus 3 is mounted on the distribution terminal apparatus 2 by the user, then the contents data of the Music 9 is copied into the portable terminal apparatus 3 and the storage contents indicated by the user contents list A2 shown in FIG. 3B are obtained.

It is to be noted that it is actually possible, for example, for the user to purchase only a right of contents data and keep the contents data itself into the tune warehouse of the user him/herself allocated by the server 1 side without downloading the contents data.

After the user purchases a right of the contents data and downloads the contents data in such a manner as described above, the user can move the contents data stored in the portable terminal apparatus 3 of the user him/herself by the downloading so as to be deposited into the tune warehouse provided in the distribution center side or re-download the tune data deposited in the tune warehouse. An operation procedure for such transfer of contents data between the portable terminal apparatus 3 and the tune warehouse is such as, for example, illustrated in FIGS. 4A, 4B and 4C.

If it is assumed that the user of the portable terminal apparatus 3 performs, for example, a predetermined operation for the distribution terminal apparatus 2 to establish an operation mode for performing transfer of contents data between the distribution center and the warehouse, then an operation screen therefor is displayed, for example, in such a manner as seen in FIG. 4A.

On the operation screen shown in FIG. 4A, a warehouse contents list A3 is displayed on the left side. The warehouse contents list A3 displayed in this instance indicates contents data whose right has been purchased by the user who owns the portable terminal apparatus 3 and which are deposited in the tune warehouse of the user him/herself which is provided on the distribution center side. Here, five contents data of the Music 3, Music 5, Music 8, Music 9 and Music 10 are listed up in the warehouse contents list A3, and when the user looks at the warehouse contents list A3, it can confirm that the five contents data are deposited in the warehouse at present.

In contrast, for example, the contents list A1 shown in FIGS. 3A and 3B indicates a list of those contents data which can be provided by the distribution center side.

On the right side of the operation screen shown in FIG. 4A, the user contents list A2 is displayed. The user contents list A2 indicates a list of the contents stored at present in the portable terminal apparatus 3 owned by the user as described hereinabove with reference to FIGS. 3A and 3B.

Further, on the left side of the warehouse contents list A3, a cursor crs1 for designating the contents in the warehouse contents list A3 is displayed, and on the right side of the user contents list A2, a cursor crs2 for designating the contents in the user contents list A2 is displayed.

Two operation buttons of a deposit button BT2 and a return button BT3 are displayed between the warehouse contents list A3 and the user contents list A2.

First, operation when contents data stored in the portable terminal apparatus 3 is to be deposited into the warehouse on the distribution center side is described.

In this instance, the user will perform a predetermined operation to move the cursor crs2 on the user contents list A2 side until it is positioned at the position of the contents data to be deposited. Here, the cursor crs2 is positioned at the Music 6. Then, in this state, the user will perform an operation for the deposit button BT2. Consequently, the operation screen changes to such a screen as shown in FIG. 4B.

On the operation screen shown in FIG. 4B, the title of the Music 6 is deleted from the user contents list A2. Instead, contents data of the Music 6 is added to the warehouse contents list A3. In other words, it is indicated that apparently the contents data of the Music 6 which has been stored in the portable terminal apparatus 3 is moved to and deposited into the warehouse on the distribution center side. Then, if the portable terminal apparatus 3 is mounted on the distribution terminal apparatus 2 then, the contents data of the Music 6 which has been stored in the portable terminal apparatus 3 is moved to the warehouse of the distribution center. It is to be noted that, while actual processing is hereinafter described, briefly describing here, the database contents on the distribution center side are updated so as to be managed as the contents data of the Music 6 is deposited into the warehouse while the contents data of the Music 6 which has been stored in the portable terminal apparatus 3 till then are deleted from the portable terminal apparatus 3. Consequently, apparently the contents data stored in the portable terminal apparatus 3 is moved to the warehouse.

In order to return contents data deposited in the warehouse at present to the portable terminal apparatus 3 side, the user will first operate, for example, the cursor crs1 displayed on the warehouse contents list A3 side on the operation screen shown in FIG. 4A to designate the contents data to be returned from the warehouse. Here, it is assumed that the contents data of the Music 9 is designated. In this state, the return button BT3 will be operated.

Consequently, the operation screen changes to such a screen as shown in FIG. 4C. In particular, the contents data of the Music 9 designated by the user is deleted from the list of the warehouse contents list A3 but is added to the user contents list A2 instead.

Consequently, the user can visually confirm that the contents data of the Music 9 has been returned to the portable terminal apparatus 3 side from the warehouse. Further, in this instance, if the portable terminal apparatus 3 is mounted on the distribution terminal apparatus 2, then the contents data of the Music 9 is actually uploaded to the portable terminal apparatus 3 from the distribution side, and the portable terminal apparatus 3 stores the contents data of the Music 9. It is to be noted that, although the entity of the contents data of the Music 9 is stored and exists in the server 1 or the distribution terminal apparatus 2, the distribution center side manages the warehouse and the contents data of the Music 9 has been drawn out from the warehouse of the user.

1-4. Database Configuration of Server

In order to allow such warehouse management of the data distribution system as described above to be performed, it is necessary, for example, for the distribution center side to have information including rights of contents data purchased by users, histories regarding the deposit situations of the contents data, whose rights have been purchased, in the warehouse and so forth. In the present embodiment, such information is stored and kept as databases in the database storage area 111 of the storage section 102 of the server 1.

FIG. 5 schematically illustrates contents of the databases stored in the database storage area 111.

The databases include, for example, a contents purchase database 111-1, a deposit situation database 111-2, a user authentication/accounting settlement database 111-3, a user taste database 111-4, and a commodity database 111-5 associated with each other.

It is to be noted that contents of the databases illustrated in FIG. 5 correspond, for example, to one user (portable terminal apparatus 3), and such database contents as seen in FIG. 5 are prepared and stored for each user. As hereinafter described, each database has information of a user ID so that it may have information corresponding to each user.

The contents purchase database 111-1 stores information regarding a purchase situation of a purchase situation of tune rights by one user and includes information of a user ID, a purchased contents ID, purchased contents name information, purchased contents quantity information, purchase history information and so forth.

The user ID is an ID provided by the distribution center side so that, for example, it may be unique to each of users having a portable terminal apparatus 3. The ID specifies the user for whom the contents purchase database 111-1 is. The user ID is used for authentication regarding, for example, when the distribution center side is accessed by the portable terminal apparatus 3 side, whether or not the portable terminal apparatus 3 is a legal one which has a legal contract concluded with the distribution center side.

Further, the distribution center side manages each contents data provided therefrom with a contents ID applied thereto. The purchased contents ID is information of contents IDs of contents data (tunes) purchased by the user.

The purchased contents name information is information of names of contents data purchased by the user. In this instance, the contents data are tune data, and accordingly, each contents name may typically be the title of the tune.

The purchased contents quantity information is information of a value representative of the quantity of contents data whose right has been purchased by the user.

The purchase history information indicates a purchase history of contents data of the user till then. In other words, data each representing a quantity of contents data represented by the contents ID and the year, month, day and hour of the purchase of the contents data are managed in a time series.

The contents purchase database 111-1 having such contents as described above thus provides information for managing the rights of the contents purchased by the user. For example, if the purchased contents ID and the purchased contents quantity information are referred to in a coordinated relationship with the user ID, then it is possible to recognize what quantity of the right of what contents data was purchased by the user indicated by the user ID.

The deposit situation database 111-2 stores information for grasping a utilization situation of the tune warehouse provided virtually for the one user on the distribution center side. The deposit situation database 111-2 includes, for example, a user ID, warehouse capacity information, deposited contents quantity, a deposited contents ID, deposited contents name information, deposit history information and deposit frequency information.

The user ID specifies a user similarly as in the contents purchase database 111-1 described above.

The warehouse capacity information is information representative of a data capacity of the tune warehouse used by the user at present.

When the user intends to deposit contents data of a tune, it urges the distribution center side to allocate a storage capacity which can be used as a warehouse by the user. For example, the capacity of part of the area of the control section 101 in the server 1 is allocated as a warehouse to the user. Then, accounting setting upon use of the tune warehouse is performed principally based on the magnitude of the capacity of the warehouse.

Here, the setting of the warehouse capacity can be performed in several manners.

First, a capacity of a warehouse which can be used by a user within a range of a certain predetermined capacity size is set in accordance with a contract in advance. For example, where the distribution center side can allocate 4 MB to the utmost to each user, a user sets a fixed warehouse capacity such as 2 MB or 3 MB taking use of the warehouse by the user him/herself and other necessary factors into consideration. Then, the accounting setting is determined in accordance with the warehouse capacity set by the user.

Second, the warehouse capacity is varied adaptively in response to the data size of contents deposited into the warehouse by the user. In particular, for example, if several contents data are deposited by the user and the total data size of the deposited contents data is 750 KB, then the accounting setting is performed in accordance with the warehouse capacity of 750 KB. Then, if some contents data is additionally deposited later and the resulting total data size of the deposited contents data is 1 MB, then the accounting setting is performed in accordance with the warehouse capacity of 1 MB.

The user authentication/accounting settlement database 111-3 has information regarding authentication and accounting of a user. The user authentication/accounting settlement database 111-3 includes a user ID, non-settled accounting data, an accounting settlement history, a settlement financial institution code and a settlement code. The information is used for management regarding accounting of a user specified by the user ID. In order to produce the user authentication/accounting settlement database 111-3, information of conditions for setting an amount of money to be imposed is required. The information for setting an amount of money to be imposed can be produced, for example, by inputting the purchased contents ID and the purchased contents quantity information to be stored into the contents purchase database 111-1 and the warehouse capacity information to be stored into the deposit situation database 111-2 as seen in FIG. 5. The purchased contents ID and the purchased contents quantity information allow accounting setting to be performed for a right purchased by the user, and the warehouse capacity information allows accounting setting to be performed in accordance with a use situation of the warehouse.

It is to be noted that the information as the conditions for the accounting settlement mentioned above is a mere example at all, and any other information may be used in accordance with a manner of actual operation of the data distribution system.

Also the accounting settlement may be performed in various manners. For example, it is possible to pay the imposed amount of money from a designated bank account or the like based on a credit card number registered in a corresponding relationship to the user ID in advance. More particularly, a server account number corresponding to the server 1, a user account number corresponding to the user, an amount of money imposed on the user, a server ID and a server password are transmitted from the server 1 to a bank center over the accounting communication network 5. The bank center thus performs an authentication process based on the server ID and the server password, and if the authentication is performed successfully, then the bank center deducts the designated imposed amount of money from an account corresponding to the user account number and increases an account corresponding to the server account number with the amount of money thereby to perform a settlement process.

Also it is a possible idea, for example, to provide the distribution terminal apparatus 2 with a function for processing a prepaid card and perform an accounting settlement by such processing as to decrease the remaining amount of money from the prepaid card inserted by the user.

The user taste database 111-4 stores information obtained based on required information stored in the contents purchase database 111-1 and the deposit situation database 111-2 for each user and allowing a tendency of the taste or the like of a tune to the user who utilizes the distribution data service to be grasped.

The information of the user taste database 111-4 is actually used, for example, by an administrator of the distribution center or a distribution source such as a record production company which provides contents data of tunes to the distribution center to designate, for example, contents data to be provided as commodities to users.

The user taste database 111-4 includes, for example, as seen in FIG. 5, a purchased contents ID, purchased contents quantity information, deposit situation information, a search key, search data, notification history information and so forth for each user specified by a user ID.

The purchased contents ID and the purchased contents quantity information are produced from information stored in and received from the contents purchase database 111-1 specified by the same user ID. The deposit situation information is produced from deposited contents information, a deposited contents ID and deposit frequency information stored in and received from the deposit situation database 111-2 specified by the same user ID.

The search key includes a plurality of search keys extracted in accordance with a predetermined condition from the purchased contents ID, purchased contents quantity information and deposit situation information described above. As an example, from the purchased contents ID and the purchased contents quantity information, a search key regarding a genre of favorite tune or a favorite artist of the user can be obtained. More particularly, a search key can be produced by extracting genre information or artist information inserted in part of contents data in advance. Meanwhile, from the deposit situation information, a search key for searching to which genre or artist a tune which is moved into and out of the tune warehouse with a high frequency belongs can be obtained. A similar method of extracting a search key to that described above can be used.

The search data represents a result of a search for contents data performed with the search key described above from the commodity database 111-5 which is described below. Further, the notification history information is information of a notification history produced with regard to the search data.

The commodity database 111-5 includes contents sales promotion data, purchase price data, search frequency data and so forth. While the commodity database 111-5 here is provided in the distribution center, for example, even where it is actually stored in a system on the record production company side which provides contents data (tunes) as commodities to the distribution center, it can be utilized effectively.

The contents sales promotion data includes data for sales promotion produced, for example, in accordance with an intention of the administrator side based on a search result of contents searched with a search key described hereinabove. The contents sales promotion data is transferred, for example, when a user accesses the server 1 using its distribution terminal apparatus 2 or the like, to the distribution terminal apparatus 2 side, for example, simultaneously contents data is provided so as to be provided to the user. For example, the user can see and take the contents of the data into consideration when it purchases a tune for itself.

The purchase price data includes information of a purchase price, for example, of contents data (a tune) for sales promotion and so forth. The purchase price data is used in such a case wherein, for example, information of a price of tune data for sales promotion is included as contents promotion data. The search frequency data includes information of a frequency in which a search is performed with a search key and so forth. The search frequency data can be used to grasp a tendency of the taste of the user who utilizes the distribution system. For example, the search frequency data can be used to produce contents sales promotion data effective to the user.

It is to be noted that, while such databases as described above are stored in the server 1, for example, if the storage section 208 of the distribution terminal apparatus 2 has a sufficient storage capacity, also it is possible to transfer contents of the databases from the server 1 to the distribution terminal apparatus 2 so that they may be stored into the distribution terminal apparatus 2. This makes it possible, for example, to perform such warehouse management of contents as hereinafter described or provision of a service in conformity to the taste of a user independently for each of the distribution terminal apparatus 2.

Since the databases have such contents as described above, in the present embodiment, it can be grasped, for example, the right of contents data of what tune has been purchased by a user.

Also the deposit situation in the warehouse of contents data whose right has been purchased can be managed.

In this manner, in the present embodiment, a right of contents data of a tune is an object of a trade and such rights are stored into and managed as a database. Further, contents data whose right is purchased can be deposited/drawn out making use of a tune warehouse provided in the distribution center side.

Consequently, for example, if a user downloads many contents data until the capacity of the recording medium owned by the user side becomes short, then if one of the contents data stored in the recording medium at present is selected suitably and moved so as to be deposited into the warehouse, then the contents data is deleted from the recording medium as much and the capacity increases as much, and consequently, favorite contents data can be purchased and downloaded newly. However, since the contents data deleted from the recording medium is deposited in the tune warehouse, the proprietary right of the user is secured, and if such an operation as described hereinabove with reference to FIGS. 4A, 4B and 4C is performed, then the contents data can be drawn out from the tune warehouse and re-downloaded. In other words, even if the capacity of the medium owned by the user side is not very great, the user need not give up contents data in the past with an intention to store new contents data.

As an example, it is assumed that a user who owns a portable terminal apparatus 3 goes, for example, to a remote place and wants to listen to a certain tune (contents data). In this instance, the user can make use of a distribution terminal apparatus 2 installed, for example, in a near place to download the contents data of the tune so as to be returned from the tune warehouse. Here, if the free capacity of the portable terminal apparatus 3 is not sufficient, then the user can first deposit contents, which are discriminated unnecessary at present, into the tune warehouse and then download the contents data desired by the user so as to purchase or return the contents data from the tune warehouse.

Further, management of rights of contents data purchased by a user and the warehouse of the user is performed by the distribution center side such as, for example, by the server 1.

Even if a user is notified, for example, that the responsibility for management of contents data after purchase of its right should be taken by the user, the contents data may be lost with a high degree of possibility for some reasons of the user side. In this instance, for example, according to a conventional contract based on the "purchase per download", in order for the user to acquire the lost contents data, the user purchases and downloads the contents data again. According to the present embodiment, however, since the right of contents data lost by the user remains on the distribution center side, such a countermeasure as re-downloading can be adopted readily, for example, without any cost or with a cost lower than that upon ordinary purchase of the right. In other words, the distribution center side has also a backup function for contents data whose right is purchased by a user.

Further, since contents data has a considerably great data size, depending upon the quality of the communication network, the possibility that, upon actual downloading, the transfer may be interrupted, resulting in failure of the downloading, is not necessarily low. Also in this instance, the user can download the contents data again, for example, without any monetary loss.

In this manner, according to the present embodiment, such a merit to a user that cannot be obtained by a trade of contents data by the "purchase per download" till now can be provided. Further, the distribution center side can incidentally impose a charge by provision of a tune warehouse, and business of a form which is quite novel can be proceeded.

Further, in the present embodiment, since the user taste database 111-4 is provided and associated with the commodity database 111-5, the tendency of the taste of each of users who utilize the data distribution system and the tendency of the taste of the entire users can be grasped and managed. Further, as described hereinabove, it is possible for the distribution side to perform effective sales promotion based on the information of the taste obtained in this manner.

Particularly in the present embodiment, contents of information stored in the user taste database 111-4 include also contents of information stored in the deposit situation database 111-2 as described hereinabove with reference to FIG. 5.

For example, in the case of the "purchase per download", only the taste based on a history of contents data purchased by a user can be grasped. In other words, such information of how frequently, for example, a user enjoys a tune as downloaded contents data cannot be obtained.

In contrast, according to the present embodiment, a utilization situation of contents data of a user after downloaded can be grasped comparatively particularly from information contents of the user taste database 111-4 produced based on information stored in the deposit situation database 111-2. For example, based on the deposit situation information, it can be grasped what contents data a user deposits in the warehouse and what contents data the user takes in the portable terminal apparatus 3 side of the user him/herself. On the other hand, based on the deposit history data included in the deposit situation information, it can be grasped what contents are stored for a long period time in the portable terminal apparatus 3 side and on the contrary what contents are deposited for a long period of time in the tune warehouse. Also a frequency of deposition/drawing out of certain contents data can be grasped.

For example, contents data which are kept drawn out for a long period of time in the portable terminal apparatus 3 without being deposited in the tune warehouse or which are transferred frequently between the tune warehouse and the portable terminal apparatus 3 side can be handled as contents data which are enjoyed frequently by the user. On the contrary, such contents data which are left deposited in the tune warehouse for a long period of time can be handled as contents data in which the user is not interested very much. In this manner, according to the present embodiment, a particular taste of a user can be grasped from a utilization situation of its tune warehouse, and sales promotion can be performed based on such tastes. In other words, sales promotion data having a higher appealing degree to users can be produced.

2. Contents Purchasing Process

In the foregoing, purchase of a right of contents data and depositing/returning of contents data into/from a tune warehouse are described as an example of a utilization form of the data distribution system, and an example of structure of the databases 111 possessed by the distribution center side (server 1) is described above. The databases 111 are accessed from a portable terminal apparatus 3 and updated in response to purchase of a right of contents data or depositing/returning of contents data into/from a tune warehouse.

Thus, processing regarding purchase of a right of contents data, depositing/returning of contents data into/from a tune warehouse and updating of the databases based on such purchase or depositing/returning is described.

Figure 6:
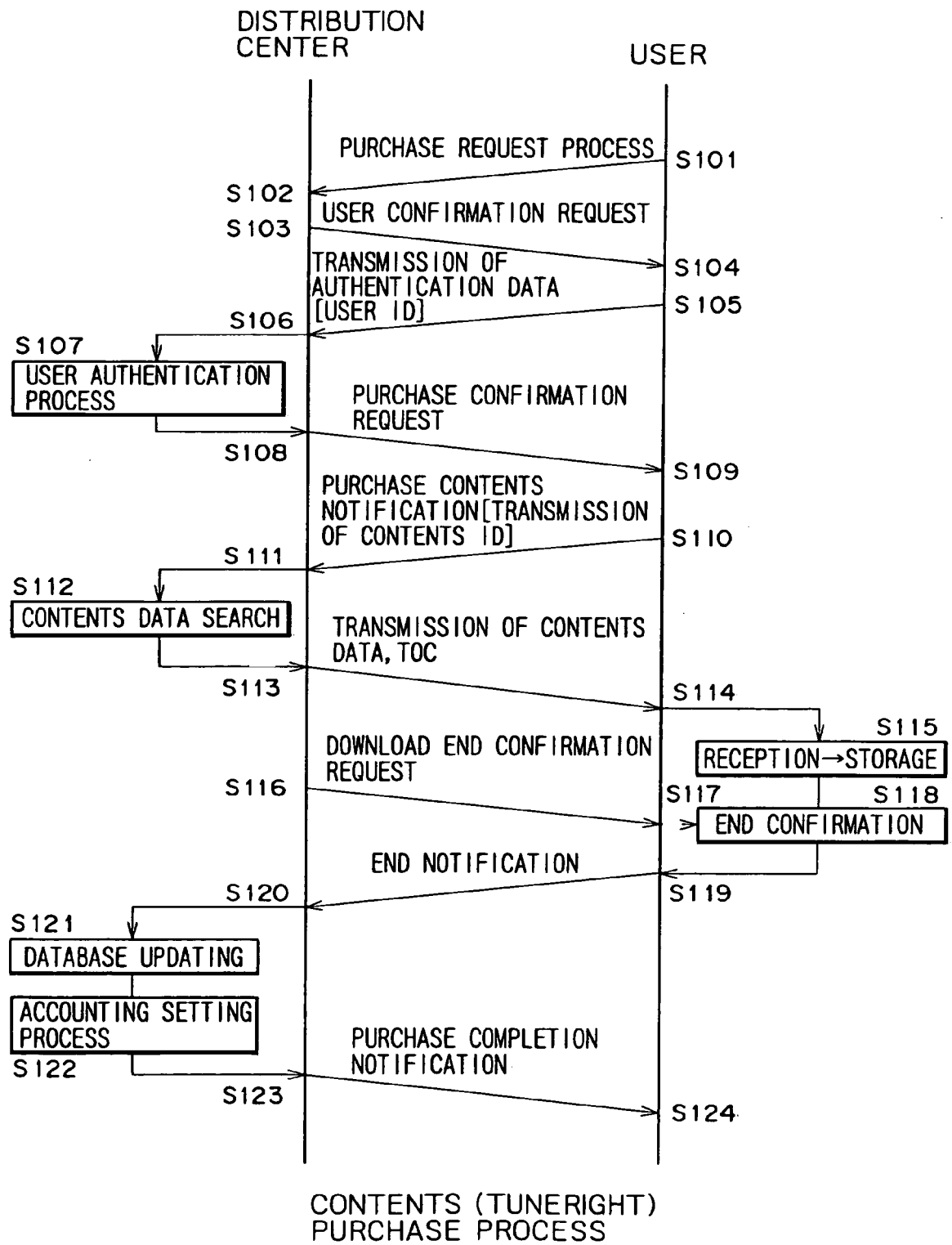
FIG. 6 is a process transition diagram illustrating processes between a distribution center and the user side in the data distribution system of FIG. 1 when contents data (a right of a tune) is purchased.

FIG. 6 is a process transition diagram illustrating processes of the distribution center side and the user side when a right of contents data is purchased. Here, the processes of the user side are processes on the portable terminal apparatus 3 side and are executed by the control section 311. Meanwhile, the processes of the distribution center side are processes typically of the server 1 and are executed by the control section 101. Where the portable terminal apparatus 3 is connected to the distribution terminal apparatus 2, the distribution terminal apparatus 2 functions to mediate the portable terminal apparatus 3 and the server 1 for communication and actually transfers data to be transmitted between the portable terminal apparatus 3 and the server 1. Processes for this are executed by the control section 207 in the inside of the distribution terminal apparatus 2. On the other hand, when the portable terminal apparatus 3 and the server 1 communicate directly with each other, the processes of the distribution center side are completed by the processes of the server 1.

For example, if it is assumed that the user of the portable terminal apparatus 3 performs a predetermined operation for the portable terminal apparatus 3 (or the distribution terminal apparatus 2) to designate certain contents data and issue a request to purchase a right of the contents data, then the purchase request is transmitted from the portable terminal apparatus 3 on the user side to the distribution center in step S101. The distribution center receives the purchase request in step S102. Then in step S103, the distribution center transmits a user confirmation request to the user side.

The user side receives the user confirmation request in step S104 and transmits authentication data in step S105. Here, as the authentication data, for example, a user ID allocated to the user who owns the portable terminal apparatus 3 and conveyed to the user or stored in the portable terminal apparatus 3 is transmitted.

The distribution center side receives the authentication data in step S106 and performs an authentication process in step S107. As the authentication process, for example, the distribution center side performs comparison between the user ID stored on the distribution center side and the user ID transmitted thereto or the like to discriminate whether or not the user (portable terminal apparatus 3) which has accessed the distribution center side is a legal one. Then, for example, if an affirmative result of the authentication is obtained, then the processing advances to step S108, in which the distribution center side transmits a purchase confirmation request to the user side.

It is to be noted that, in an actual authentication process, for example, as information to be transmitted from the portable terminal apparatus 3 side, for example, a portable terminal ID allocated so as to be unique to each portable terminal apparatus 3 may be transmitted in place of a user ID. Further, actually information for authentication may be enciphered and transmitted and received while key information and so forth for deciphering the cipher is prepared and transmitted.

The user side receives the purchase confirmation request in step S109 and issues a notification of a tune to be purchased, for example, as a purchase confirmation process, for example, in next step S110. In particular, as an actual process, the user side transmits a contents ID provided to the contents data (tune) selectively designated by an operation of the user to the distribution center side. It is to be noted that, in this instance, for example, a plurality of contents data may be designated as contents data to be purchased at a time, and in step S110, contents IDs of the plurality of contents data may be transmitted.

The distribution center side receives the contents ID transmitted thereto and searches the contents data stored in the distribution center side for contents data specified by the received contents ID. In this instance, the control section 101 controls the search section 103 to search the contents data stored in the storage section 102. If the portable terminal apparatus 3 is connected to the distribution terminal apparatus 2 and the contents data is stored in the storage section 208 of the distribution terminal apparatus 2, then the contents data stored in the storage section 208 may naturally be searched.

After the search for the object contents data is performed in step S112 as described above, the distribution center side transmits the searched out contents data and management data in next step S113. It is to be noted that, although details of the management data are hereinafter described, the management information has information contents with which contents to be copied or moved between the server 1, a distribution terminal apparatus 2 and a portable terminal apparatus 3 of the data distribution system can be managed. In the following description, such management data may be referred to also as TOC (Table of Contents). TOC corresponds to the FAT (File Allocation Table) in the MS-DOS.

The user side (portable terminal apparatus 3) starts reception of the contents data and the TOC transmitted thereto in such a manner as described above in step S114 and then stores the contents data and the TOC into the storage section 320 in step S115 while continuing the reception of the contents data and the TOC.

Here, the distribution center side transmits a download end confirmation request at a predetermined timing after the contents data and the TOC are transmitted in step S113. The portable terminal apparatus 3 side which is the user side receives the download end confirmation request in step S117 and then performs end confirmation, for example, in step S118 at a point of time when reception and storage of the contents data and the TOC is completed. Then, the portable terminal apparatus 3 side transmits an end notification indicating that the downloading is ended in step S119.

The distribution center side receives the end notification in step S120. Consequently, it is confirmed by the distribution center that the downloading of the contents data at present has completed appropriately.

Then, the distribution center side modifies the databases in accordance with a result of the processes in next step S121. In particular, for example, the contents purchase database 111-1 is updated first. Consequently, it is settled that the user has a right of the contents data downloaded this time, and thereafter, management is performed by the distribution center side. It is to be noted that, even if actually a downloading process of contents data should result in failure, the distribution center side produces the databases so as to manage that the right of the contents data is possessed by the user.

Then, for example, in next step S122, accounting setting regarding the right of the contents data purchased this time is performed. For example, an amount of money to be imposed is set in accordance with the contents, and in order that the imposed amount of money may be collected, the number of a credit card or an account number inputted by the user is enciphered and transmitted together with the information of the imposed amount of money, for example, over the accounting communication network 5. For example, actually the user authentication/accounting settlement database 111-3 is produced or updated incidentally.

After the processes up to step S122 are completed in this manner, the distribution center side transmits a purchase completion notification to the user side in step S123. As the user side receives the purchase completion notification in step S124, it can confirm that the right purchase contract of the contents data has been concluded.

3. Contents Depositing Process

In the foregoing, processing when contents data which is stored in the storage section 320 of a portable terminal apparatus 3 and thus possessed by the user side is deposited into the tune warehouse is described with reference to a processing transition diagram of FIG. 7.

In this instance, the user side (portable terminal apparatus 3) first transmits a request to deposit contents data into its tune warehouse to the distribution center side, for example, in response to a predetermined operation of the user in step S201. The distribution center receives the request in step S202 and transmits a user confirmation request to the user side in step S203. Here, the processes in steps S203 to S207 are similar to those in the processing for authentication described hereinabove in connection with steps S103 to S107 of FIG. 6, and therefore, overlapping description of them is omitted herein to avoid redundancy. Then, for example, if an affirmative result of the user authentication is obtained in step S207, then the distribution center side transmits a deposit contents confirmation request to the user side in step S208.

The user side receives the deposit contents confirmation request in step S209 and transmits a contents ID of the contents data designated to be deposited this time in step S210. In this instance, for example, a plurality of contents IDs may be transmitted so that a plurality of contents data may be deposited.

The distribution center side receives the contents ID corresponding to the tune to be deposited in step S211 and refers to the contents of the databases relating to the user in step S212. Here, the distribution center side checks, for example, whether or not a right of the contents data of an object of the request for deposit has been purchased by the user in accordance with an appropriate procedure and further checks, for example, if the contract is such that the capacity of the tune warehouse is set and allocated fixedly, the free capacity of the tune warehouse capacity allocated to the user and so forth based on the warehouse capacity information. Then, if it is discriminated from a result of the checks that the contents data can be deposited, then the distribution center side issues a notification of approval of the deposit to the user side.

The user side (portable terminal apparatus 3) receives the notification of approval of the deposit in step S214 and executes, in next step S215, for example, a process for erasing the contents data designated as an object of the deposit this time from the contents data stored in the storage section 320 of the portable terminal apparatus 3.

After the data erasure is completed, the user side issues, in step S216, a notification that erasure of the contents data has been performed. In this instance, for example, at least the stored contents of the storage section 320 of the portable terminal apparatus 3 are changed. To this end, for example, in the portable terminal apparatus 3, updating of the TOC used for management of the contents data recorded in the storage section 320 is performed actually. Further, for example, the updated TOC is transmitted in this instance. Consequently, for example, the server 1 on the distribution center side or the distribution terminal apparatus 2 side can utilize the TOC transmitted thereto from the portable terminal apparatus 3 to produce a TOC wherein at least the contents data stored in and managed by the server 1 or distribution terminal apparatus 2 itself and the contents data stored in the portable terminal apparatus 3 for the individual personal users can be managed in a coordinated relationship with each other.

Although the erasure processing of the contents data merely is rewriting of the TOC which is management data, where the storage medium of the portable terminal apparatus 3 typically is a flash memory or a like memory which does not allow overwriting, the control section 311 may actually execute a process of erasing the stored contents from the flash memory.

The distribution center side receives the contents erasure notification in step S217 and executes the following process in nest step S218.

In particular, in step S218, the distribution center side first updates the databases in accordance with a result of the processes described above. Here, the distribution center side updates the deposit situation database 111-2 for the tune warehouse management so that the contents data which has been deposited this time is managed as being present in the tune warehouse. Here, since erasure of the contents data to be deposited has been performed by the processing in preceding step S215 by the portable terminal apparatus 3 side, it seems, for example, to the user who has the portable terminal apparatus 3 that the contents data has been transferred so as to be moved from the portable terminal apparatus 3 to the distribution center side and deposited into the tune warehouse.

Further, in step S218, if the deposit of the contents data this time gives rise to a change in the imposed amount of money for the warehouse management, then the distribution center side performs an accounting setting process and further performs updating of the user authentication/accounting settlement database 111-3.

After the process in step S218 is completed, the distribution center side transmits a deposit confirmation notification to the user side in step S219. As the user side receives the deposit confirmation notification in step S220, it can confirm that the processing for depositing of the contents data of an object of the request this time has come to an end regularly.

4. Contents Returning Process

In the foregoing, processing when contents data which is deposited in the tune warehouse is returned to the portable terminal apparatus 3 side is described with reference to a processing transition diagram of FIG. 8.

Also in this instance, the user side first transmits a request to return contents data deposited in the tune warehouse, for example, in response to an operation of the user in step S301.

The distribution center receives the request in step S302 and transmits a user confirmation request to the user side in step S303. Also in this instance, the processes in steps S303 to S307 are similar to those in the processing for user authentication described hereinabove in connection with steps S103 to S107 of FIG. 6.

Then, if an affirmative result of the user authentication is obtained in step S307, then the distribution center side transmits a confirmation request of the contents data to be returned from the tune warehouse to the portable terminal apparatus 3 side by the user in step S308. The user side receives the confirmation request in step S309 and issues a notification of a contents ID of the contents data to be returned in next step S310.

The distribution center side receives the contents ID in step S311 and refers to the contents of the databases managed with the user ID of the user based on the contents ID to confirm whether or not the contents data of an object of the request for returning may be permitted to return in step S312. For example, the distribution center side refers to the contents purchase database 111-1 and the deposit situation database 111-2 to confirm whether or not a right of the contents data of the object of the request for returning is possessed by the user at present and is managed as being kept in the tune warehouse at present, and so forth.

Then, for example, if it is discriminated from a result of the processing in step S312 that the contents data of the object of the request may be permitted to return, then the distribution center side searches, for example, where the server 1 performs the processing, the contents data storage area 110 of the storage section 102 for the contents data of the object of the request in next step S313. Then in next step S314, the distribution center side transfers a copy of the searched out contents data and transmits the TOC whose contents are changed by the transfer.

The user side starts reception of the contents data and the TOC transmitted thereto in step S315 and then continuously executes, in next step S316, the reception of the data and storage of the data into the storage section 320.

Then in the following steps S317 to S321, processing similar to, for example, the mutual confirmation processing for ending downloading described above as the processes in steps S116 to S120 with reference to FIG. 6 is executed.

The distribution center side receives the ending notification transmitted from the user side in step S321 and updates the databases in next step S322. If the returning of the contents data to the portable terminal apparatus 3 side gives rise to a change in the imposed amount of money, then the distribution center side performs an accounting setting process. The process in step S322 is similar to that in step S218 of FIG. 7. In particular, the distribution center side changes the contents of the deposit situation database 111-2 so that the warehouse management may be performed on the distribution center side, for example, as the contents data has been returned from the tune warehouse to the portable terminal apparatus 3.

After the process in step S322 is completed, the distribution center side transmits a deposit confirmation notification to the user side in step S323 to notify that the processing of returning the contents data has come to an end regularly. As the user side (portable terminal apparatus 3) receives the deposit confirmation notification in step S324, it can confirm that the processing for returning the contents data has come to an end regularly.

5. Management Data of the Embodiment 5-1. Example of Management Data Structure

In the processing operations described hereinabove with reference to FIGS. 6, 7 and 8, it is indicated that, when copying or movement of contents data is performed between the distribution center side and the user side, also transmission/reception of the TOC (management data) is performed.

The TOC has a predetermined structure and is stored, for example, in the storage section of each of the apparatuses (server 1, distribution terminal apparatus 2 and portable terminal apparatus 3) which forms the data distribution system. The TOC is read out and utilized suitably when necessary.

The TOC read out is used not only to display such operation screens as described above with reference to FIGS. 3A, 3B, 4A, 4B and 4C but also to search and access contents data stored in the server 1 or the distribution terminal apparatus 2 in response to a request from the user (portable terminal apparatus 3) side. Further, in the present embodiment, for example, such operation screens as described above with reference to FIGS. 3A, 3B, 4A, 4B and 4C can be outputted, for example, on the distribution center side, from the distribution terminal apparatus 2 by itself even in another environment wherein the portable terminal apparatus 3 is not mounted and consequently the TOC cannot be acquired from the portable terminal apparatus 3. This arises from the fact that the TOC in the present embodiment is so structured that the TOC contents for management of contents data stored on each of the apparatuses (server 1, distribution terminal apparatus 2 and portable terminal apparatus 3) which forms the data distribution system and the TOC contents for management of contents data stored in at least one kind of the other apparatus are associated with each other. In other words, the TOC in the present embodiment does not have contents which are complete and independent of each other among the server 1, distribution terminal apparatus 2 and portable terminal apparatus 3, but has contents common between different ones of the server 1, distribution terminal apparatus 2 and portable terminal apparatus 3.

FIGS. 9A to 9E illustrate a concept of contents data management among the apparatuses which form the data distribution system with such TOC in the present embodiment as described above.

In FIG. 9A, actual addresses of those contents data stored in the storage section 102 of the server 1 which can be accessed by the portable terminal apparatus 3 or the distribution terminal apparatus 2 are illustrated. In FIG. 9B, actual addresses of contents data stored in the storage area (storage section 208) of the distribution terminal apparatus 2 are illustrated. In FIG. 9C, actual addresses of contents data stored in the storage area (storage section 320) of the portable terminal apparatus 3 are illustrated. In order to execute a writing/reading out process of contents data is performed independently for each of the portable terminal apparatus 3, distribution terminal apparatus 2 and server 1, such actual addresses are utilized directly.

It is considered that, as the TOC in the present embodiment, a first TOC illustrated in FIG. 9D and a second TOC illustrated in FIG. 9E are available.

The first TOC is composed of the server TOC corresponding to the server 1 and the first distribution terminal TOC corresponding to a distribution terminal apparatus 2. The first TOC is possessed commonly by the server 1 and the distribution terminal apparatus 2.

The server TOC is produced, for example, by replacing the actual addresses of the accessible area of the server 1 with "virtual addresses (logical addresses)" prescribed so as to allow processing on the distribution terminal apparatus 2 side as well. Similarly, the first distribution terminal TOC is produced by replacing the actual addresses of the storage area of a distribution terminal apparatus 2 with virtual addresses.

In short, the first TOC has the server TOC and the first distribution terminal TOC both described with the virtual addresses. In other words, contents data stored in the server and the contents data stored in the distribution terminal apparatus 2 are managed with the single TOC called first TOC.

Thus, contents data stored in the server 1 and accessible from another apparatus and contents data stored in the distribution terminal apparatus 2 can be managed in a centralized manner by referring to the contents of the first TOC. Then, if the first TOC is referred to, then, for example, the distribution terminal apparatus 2 can access not only the contents stored in the storage section 208 of the distribution terminal apparatus 2 itself but also the contents stored in the storage section 102 of the server 1.

Further, in order to produce and display a center contents list as illustrated, for example, in FIGS. 3A and 3B on the distribution terminal apparatus 2, the distribution terminal apparatus 2 can execute the operation by itself without accessing the server 1 to acquire the TOC. Since this eliminates the necessity for transmission/reception of the TOC to/from the server 1, for example, reduction of the time until the operation screen is displayed and reduction of the burden of the communication processing can be anticipated.

The second TOC is possessed commonly by the distribution terminal apparatus 2 side and the portable terminal apparatus 3 side and consequently is formed from the second distribution terminal TOC and the portable terminal TOC as seen from FIG. 9E. Also in this instance, the second distribution terminal TOC is produced by replacing the actual addresses of the storage area of the distribution terminal apparatus 2 with virtual addresses which allow processing also on the portable terminal apparatus 3 side. The portable terminal TOC is produced by replacing the actual addresses of the storage area of the portable terminal apparatus 3 with virtual addresses which allow processing also on the distribution terminal apparatus 2 side.

Thus, contents data stored in the distribution terminal apparatus 2 and contents data stored in the portable terminal apparatus 3 can be managed in a centralized manner with the second TOC described above. In this instance, if the second TOC is referred to, then, for example, the portable terminal apparatus 3 can access not only the contents stored in itself but also the contents stored in the distribution terminal apparatus 2.

Further, if ID information with which a user or a portable terminal apparatus 3 can be specified such as a user ID or a portable terminal ID unique to the portable terminal apparatus 3 is inputted to the distribution terminal apparatus 2, then the distribution terminal apparatus 2 by itself can display such an operation screen as shown in FIGS. 3A and 3B without acquiring the TOC from the portable terminal apparatus 3.

FIGS. 10 and 11 show data structures of the first TOC and the second TOC described above, respectively. It is to be noted that the structures shown in FIGS. 10 and 11 are conceptive structures at all, and for example, the first TOC and the second TOC may actually have any form only if contents data stored in those apparatuses which at least use the common TOC are managed with virtual addresses which allow processing among the apparatuses.

The first TOC has a user ID placed at the top position thereof as seen, for example, in FIG. 10 and accordingly is information corresponding to each user.

Below the user ID, the server TOC and the first distribution terminal TOC are placed in parallel. The server TOC includes a server ID, which is unique to each server, placed at the top thereof and thus specifies a server. Contents managed by the server indicated by the server ID are placed below the server ID. The contents data stored in the actual storage area are managed, for example, in such a form that virtual addresses are coordinated with contents IDs as seen in FIG. 10. Similarly, the first distribution terminal TOC has a distribution terminal ID, which is unique to each distribution terminal apparatus 2, placed at the top thereof such that the distribution terminal apparatus 2 which has the first distribution terminal TOC is specified with the distribution terminal ID. Below the distribution terminal ID, contents IDs of contents data stored in the distribution terminal apparatus 2 and virtual addresses are placed in a coordinated relationship.

Also with the second TOC, a user is specified with the user ID placed at the top as seen in FIG. 11. Below the user ID, the second distribution terminal TOC and the portable terminal TOC are placed.

The second distribution terminal TOC has a distribution terminal ID placed at the top thereof as seen in FIG. 11, and below the distribution terminal ID, contents IDs and the virtual addresses are stored in a coordinated relationship. Similarly, the portable terminal TOC has a portable terminal ID, which is unique to each portable terminal apparatus 3, placed at the top thereof and specifies the portable terminal apparatus 3 which has the portable terminal TOC. Below the portable terminal ID, contents IDs of contents stored in the portable terminal apparatus 3 and virtual addresses are stored in a coordinated relationship.

5-2. Example of Data Distribution Process Based on Management Data

Figure 7:
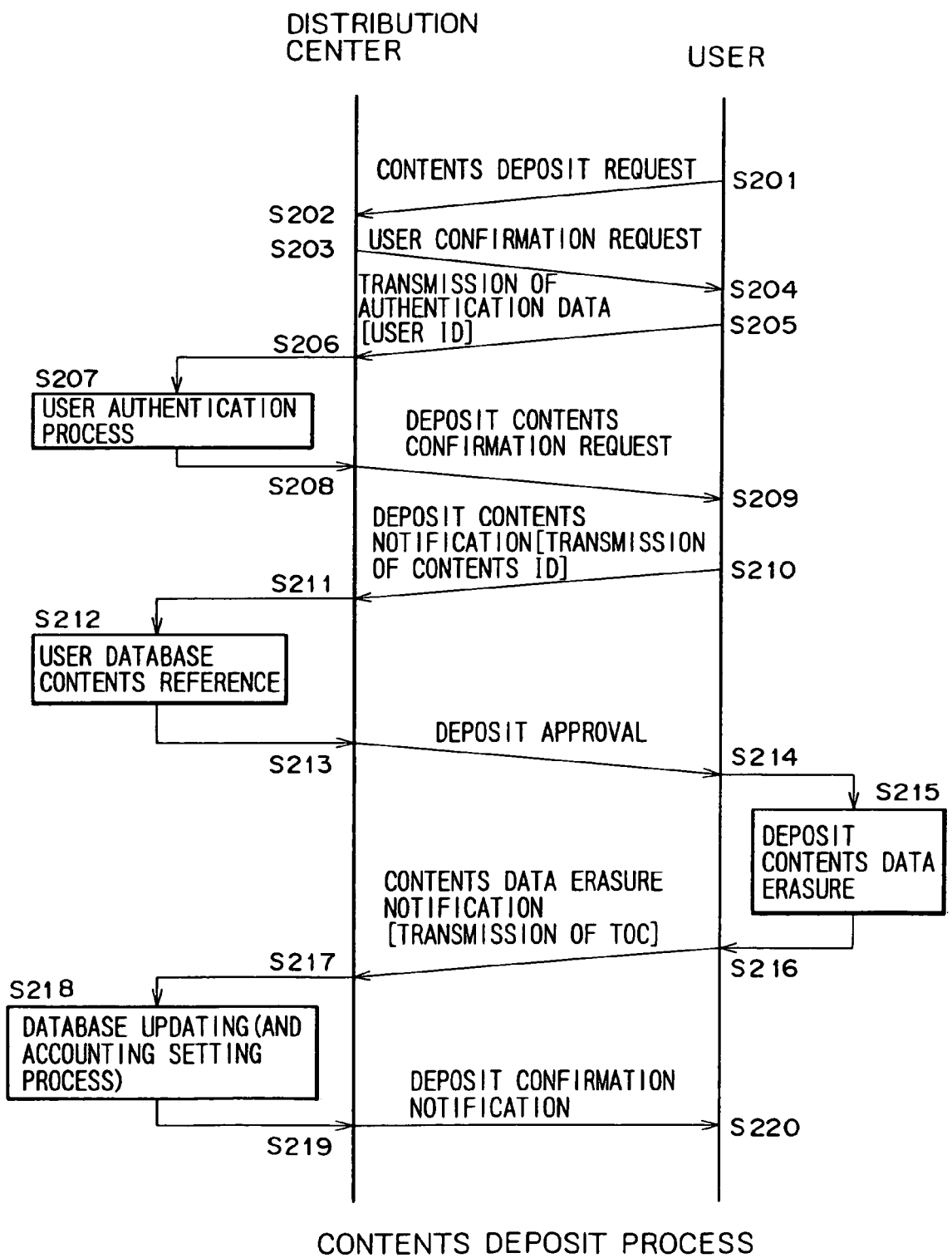
FIG. 7 is a diagram, similar to FIG. 6, but illustrating processes between the distribution center and the user side in the data distribution system of FIG. 1 when contents data is deposited into a tune warehouse.
Figure 8:
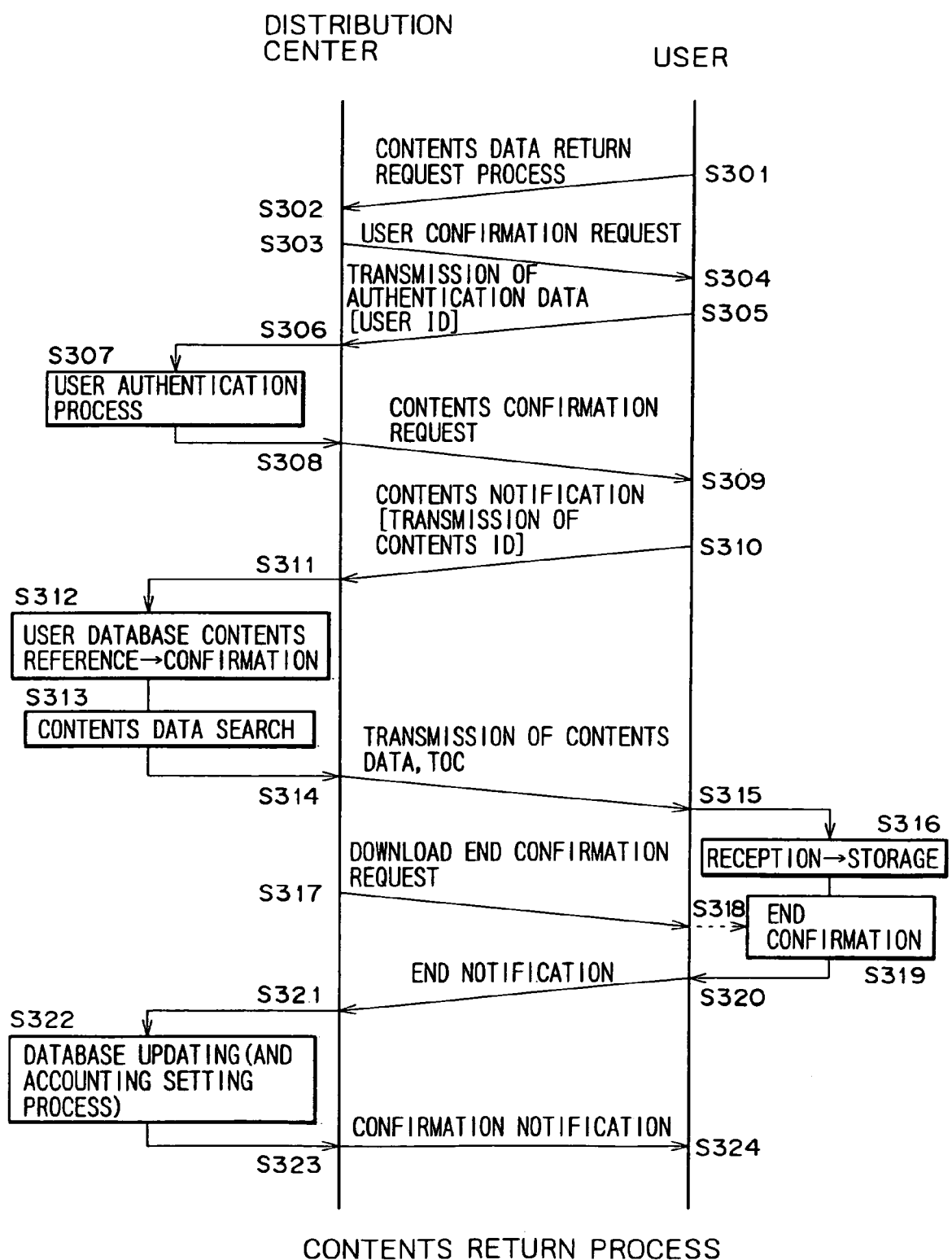
FIG. 8 is a similar view but illustrating processes between the distribution center and the user side in the data distribution system of FIG. 1 when contents data is returned from the tune warehouse.

In the processing operations of FIGS. 6, 7 and 8, principally communication processing regarding purchase and downloading of a right of contents data and depositing/returning of contents data into/from a tune warehouse is illustrated.

Thus, processing operation principally of accessing with the TOC described above upon downloading of contents data when, for example, purchase of (a right of) contents data or returning of contents data from a tune warehouse is described below.

FIG. 12 illustrates processes of the server 1, a distribution terminal apparatus 2 and a portable terminal apparatus 3 when the portable terminal apparatus 3 downloads contents data from the server 1 on the premise that the portable terminal apparatus 3 is connected to the distribution terminal apparatus 2. The processing of the server 1 is executed by the control section 101, and the processing of the distribution terminal apparatus 2 is executed by the control section

207. The processing of the portable terminal apparatus 3 is executed by the control section 311.

Also it is a premise that the first TOC is stored in the storage sections (102 and 208) of the server 1 and the distribution terminal apparatus 2 and the second TOC is stored in the storage sections (208 and 320) of the distribution terminal apparatus 2 and the portable terminal apparatus 3.

Upon downloading of contents data, the portable terminal apparatus 3 first waits that a request for downloading is received in step S401.

Then, for example, if a request for downloading is received as a result of an operation performed by the user for starting downloading with a tune as contents designated, then the processing advances to step S402. In this instance, the first TOC and the second TOC are possessed commonly by the distribution terminal apparatus 2 connected to the portable terminal apparatus 3 and the server 1 as described hereinabove.

Since the second TOC described hereinabove with reference to FIG. 11 is stored in the portable terminal apparatus 3, the user ID and the portable terminal ID stored in the second TOC are transmitted to the distribution terminal apparatus 2 in step S402. The user ID and the portable terminal ID are used, for example, for an authentication process on the distribution terminal apparatus 2 side. In step S402, also the contents ID of the contents data designated as an object of downloading is transmitted together with the user ID and the portable terminal ID.

Although the portable terminal apparatus 3 updates the second TOC possessed by itself based on data transmitted from the distribution terminal apparatus 2 side in such a manner as hereinafter described, in step S403 next to step S402, the portable terminal apparatus 3 executes a process for partitioning of the storage section 320 so that, for example, the second TOC updated by the portable terminal apparatus 3 can be stored into the storage section 320.

Thereafter, in step S404, the portable terminal apparatus 3 transmits, from within the second TOC possessed by the portable terminal apparatus 3 at present, the portable terminal TOC which is contents of the TOC regarding at least the contents stored in the portable terminal apparatus 3 itself.

Meanwhile, the distribution terminal apparatus 2 side first waits in step S431 that a request for downloading is received from the portable terminal apparatus 3 side. Then, when the distribution terminal apparatus 2 confirms reception of information transmitted by the processing of the portable terminal apparatus 3 side in steps S402 and S404, it discriminates that a downloading request has been received and thus advances its processing to next step S432.

In step S432, the distribution terminal apparatus 2 performs an authentication process regarding whether or not the portable terminal apparatus 3 which has transmitted the downloading request is a legal one. This can be realized, as in the processing operations described hereinabove with reference to FIGS. 6,7 and 8, for example, by comparison between the user ID and the portable terminal ID transmitted as a result of the processing in step S402 and the user ID and the portable terminal ID possessed by the distribution terminal apparatus 2 side. Alternatively, also it is possible to use the contents ID transmitted as a result of the processing in step S402 for the authentication process. In other words, if the portable terminal apparatus 3 is not a legal one, then the contents ID transmitted therefrom does not have a form which allows management by the distribution center side, and therefore, the contents ID can be utilized for the authentication process.

Then, if an affirmative result that the portable terminal apparatus 3 connected to the distribution terminal apparatus 2 at present is a legal one is obtained in step S432, then the processing advances to step S433. It is to be noted that, though not illustrated in FIG. 12, if an affirmative authentication result is not obtained, then, for example, a warning is displayed on the display section and no further processing is executed.

Although the server 1 stores all contents data which can be provided from the distribution center, in the present embodiment, the distribution terminal apparatus 2 stores the contents data received from the server 1, for example, by downloading processes till then in the storage section 208 of the distribution terminal apparatus 2 itself.

Thus, in step S433, the distribution terminal apparatus 2 searches the contents data stored in the storage section 208 of the distribution terminal apparatus 2 itself for contents data indicated by the contents ID received in preceding step S431. This is performed by referring, for example, to the second distribution terminal TOC of the second TOC or the first distribution terminal TOC of the first TOC stored in the same storage section 208.

Then in next step S434, the distribution terminal apparatus 2 discriminates whether or not the contents data is present in the storage section 208 in the distribution terminal apparatus 2 as a result of the search in step S433. Then, if an affirmative result is obtained in step S434, then the processing advances to step S435, but if a negative result is obtained, then the processing advances to step S438.

In step S435, the distribution terminal apparatus 2 transmits the user ID, distribution terminal ID and portable terminal ID from within the contents of the second TOC of the distribution terminal apparatus 2 itself and transfers the contents ID which exhibits a hit upon the search and a virtual address coordinated with the contents ID to the portable terminal apparatus 3. Then in next step S436, the distribution terminal apparatus 2 reads out the searched out contents data from the storage section 208 and transfers the read out contents data to the portable terminal apparatus 3.

When the distribution terminal apparatus 2 reads out the contents data from the storage section 208, it first searches for a virtual address of the distribution terminal TOC of the second TOC coordinated with the contents ID transmitted from the portable terminal apparatus 3. Then, the control section 207 converts the virtual address into a corresponding actual address of the storage section 208 and accesses the actual address to read out the contents data. In other words, the control section 207 has a logical to physical address conversion function of converting a virtual address into an actual address of the storage section 208.

The portable terminal apparatus 3 waits, in step S405, for reception of information transmitted as a result of the processing in step S435. If such information is received, then the portable terminal apparatus 3 waits, in step S406, that the contents data transferred as a result of the processing in step S436 is received. Then, if it is discriminated that such contents data is received, then the processing advances to step S407.

In step S407, the portable terminal apparatus 3 executes control processing for writing the received contents data into the storage section 320. Then, when the storage of the contents data is completed, the portable terminal apparatus 3 updates the second TOC in next step S408. In particular, the portable terminal apparatus 3 updates contents of the portable terminal TOC of the second TOC so that the contents data stored in the storage section 320 as a result of the processing in step S407 may be reflected on the contents of the TOC and further updates the (second) distribution terminal TOC of the second TOC making use of the information (distribution terminal ID, contents ID and virtual address (of the distribution terminal apparatus 2)) received in step S405.

Also on the distribution terminal apparatus 2 side, updating of contents of the second TOC is performed in a similar manner after contents data are transmitted in step S436 described above. Accordingly, at least in this stage, the contents of the second TOC possessed commonly by the portable terminal apparatus 3 and the distribution terminal apparatus 2 match with each other. However, the contents updated finally in step S408 are not reflected on the second TOC stored in the distribution terminal apparatus 2.

On the other hand, if a negative result is obtained in step S434 and the processing advances to step S438, then the distribution terminal apparatus 2 thereafter performs accessing for acquiring contents data from the server 1. Thus, in this step S438, the distribution terminal apparatus 2 first transfers the user ID, the server ID and the distribution terminal ID described in the first TOC and the distribution terminal TOC of the first TOC to the server 1. Further, the distribution terminal apparatus 2 transmits the contents ID designated from the portable terminal apparatus 3 this time.

The server 1 side first waits, in step S451, that a downloading request transferred from the distribution terminal apparatus 2 side is received. Then, when the server 1 receives the information transferred as a result of the processing in step S438 described above, it determines that a downloading request has been received, and advances its processing to step S452.

In step S452, the server 1 searches for contents data. If contents data are deposited in the server 1, then the server 1 refers to the first TOC which has the received user ID. Then, the server 1 searches for a virtual address coordinated with the contents ID from within the first TOC and accesses an actual address of the storage section 102 corresponding to the virtual address. Also the control section 101 has a logical to physical address conversion function similarly as described hereinabove. On the other hand, upon purchase of a right of contents data, the server 1 searches for the received contents ID from within the server TOCs of all of the first TOCs stored in the storage section 102. Then, the control section 101 accesses the storage section 102 based on the virtual address corresponding to the contents ID.

As processing after the search is performed in such a manner as described above, in this instance, the server 1 updates the contents of the first TOC in step S453. Here, the server 1 updates the (first) distribution terminal TOC based on the information (user ID, distribution terminal ID, contents ID and distribution terminal TOC of the first TOC) received from the distribution terminal apparatus 2 side in step S451. In particular, the first TOC of the server 1 is updated with the latest distribution terminal TOC corresponding to the user ID such that the distribution terminal TOC includes the virtual address corresponding to the contents ID. Consequently, the server 1 side by itself can grasp what the management of the contents data in the distribution terminal apparatus 2 which has accessed the server 1 this time is. However, updated contents by updating (step S444) of the distribution terminal TOC of the first TOC of the distribution terminal apparatus 2 which is hereinafter described are not updated in step S453.

Thereafter, the server 1 side transmits the user ID, server ID and distribution terminal ID to the distribution terminal apparatus 2 in step S454 and transmits the server TOC. The server TOC additionally has the contents ID of the contents designated as an object of downloading this time and a virtual address coordinated with the contents ID and therefore has contents which allow later accessing to the contents directly by designation of the virtual address without the necessity for a search for the contents ID.

Then in next step S455, the contents data searched out in step S452 is read out from the storage section 102 and transferred to the distribution terminal apparatus 2.

The distribution terminal apparatus 2 waits, in step S439, for reception of the information transferred from the server 1 as a result of the processing in step S454. If it is discriminated that the information is received, then the distribution terminal apparatus 2 advances its processing to step S440, in which it waits for reception of the contents data transferred from the server 1 as a result of the processing in step S455. Then, if it is discriminated in step S440 that the contents data is received, then the processing advances to step S441.

In step S441, the distribution terminal apparatus 2 writes the contents data received in step S440 into the storage section 208 of the distribution terminal apparatus 2 itself so that the storage section 208 may store the contents data. Then in next step S442, the distribution terminal apparatus 2 transfers the user ID, distribution terminal ID, portable terminal ID, contents ID and virtual address received from the server 1 side in step S439 to the portable terminal apparatus 3. Here, the virtual address is a virtual address reflected on the second TOC in accordance with the address into which the contents data transferred from the server 1 is stored. In other words, the second TOC in the portable terminal apparatus 3 can be updated in accordance with the virtual address.

Here, in the present embodiment, an example is described wherein contents data is stored also into the storage section 208 of the distribution terminal apparatus 2 in response to a downloading request from the portable terminal apparatus 3. However, the storage section 208 may be utilized only as a transfer buffer for transferring contents data from the server 1 to the portable terminal apparatus 3. In this instance, the contents data is erased from the storage section 208 after the downloading process is completed. Consequently, contents of the distribution terminal TOC of the corresponding first TOC and the distribution terminal TOC of the corresponding second TOC are not updated either.

Then in next step S443, the distribution terminal apparatus 2 transfers the contents data received in step S440 to the portable terminal apparatus 3.

In response to the contents data, the portable terminal apparatus 3 performs the processing in steps S406 et seq. described hereinabove.

After the transfer of the contents data in step S443 comes to an end, the distribution terminal apparatus 2 performs, in next step S444, for example, replacement of the contents of the server TOC of the first TOC and converts the physical address of the storage section 208 in which the contents data transferred from the server 1 is to be stored into a virtual address and then rewrites the contents of the (first) distribution terminal TOC thereby to update the first TOC. The distribution terminal apparatus 2 performs updating of the second TOC as well. Similarly, the distribution terminal apparatus 2 converts the physical address of the storage section 208 into which contents data transferred from the server 1 is to be stored into a virtual address and performs updating of the distribution terminal TOC of the second TOC as well.

In the present embodiment, such processes as described above are executed, for example, upon downloading upon purchase of a right of contents data described hereinabove with reference to FIGS. 3A and 3B or downloading upon returning of contents data deposited in the tune warehouse described hereinabove with reference to FIGS. 4A to 4C. In this instance, since management of the contents data is performed, for example, based on the TOC (first TOC and second TOC) illustrated in FIGS. 9A to 9E, 10 and 11, for example, the user of the portable terminal apparatus 3 can access the information stored in the server 1 through the distribution terminal apparatus 2. In this instance, for example, since the first TOC allows the distribution terminal apparatus 2 and the server 1 to commonly have the management information of the contents individually stored therein, for example, the distribution terminal apparatus 2 by itself can display such a contents list A1 as shown in FIGS. 3A and 3B. Accordingly, the contents list A1 can always present a list of all of the contents data stored in the server 1 side, and the user of the portable terminal apparatus 3 need not particularly be conscious whether contents stored in the distribution center side is present only on the server 1 side or is stored in the distribution terminal apparatus 2. Further, since also the TOC contents of the portable terminal apparatus 3 are stored as the second TOC in the distribution terminal apparatus 2, file accessing between the portable terminal apparatus 3 and the distribution terminal apparatus 2 is allowed.

Further, upon returning processing of contents data deposited in the tune warehouse, since the first TOC and the second TOC were updated already upon the depositing, the control section 311 of the portable terminal apparatus 3 transmits the user ID, the portable terminal ID, the contents ID and the virtual address of the distribution terminal TOC of the second TOC in step S402. In this instance, the control section 207 of the distribution terminal apparatus 2 converts the virtual address into an actual address and can access desired contents data directly.

Also where the contents data is stored not in the storage section 208 of the distribution terminal apparatus 2 but in the storage section 102 of the server 1, since the contents ID is registered already in the first TOC of the distribution terminal apparatus 2, if a virtual address corresponding to the contents ID searched out from the first TOC of the distribution terminal apparatus 2 is transmitted from the distribution terminal apparatus 2 to the server 1, then the server 1 can access the contents data in the storage section 102 not by a search process for the contents ID but by an easy process of logical to physical conversion of an address.

Since the TOCs possessed by the server 1, distribution terminal apparatus 2 and portable terminal apparatus 3 are updated in such a manner as described above, easy direct accessing which includes no search can be achieved.

In the first TOCs possessed by the server 1, a distribution terminal TOC increases in response to a distribution terminal ID with which the server 1 is accessed newly, and finally, a plurality of distribution terminal TOCs are stored for each user ID.

In the first TOCs possessed by the distribution terminal apparatus 2, a server TOC increases in response to a server ID with which the distribution terminal apparatus 2 accesses newly, and finally, a plurality of server TOCs are stored for each user ID.

In the second TOCs possessed by the distribution terminal apparatus 2, a portable terminal TOC increases in response to a new portable terminal apparatus 3 which accesses the distribution terminal apparatus 2, and finally, a plurality of portable terminal TOCs are stored for each user ID.

In the second TOCs possessed by the portable terminal apparatus 3, a distribution terminal TOC increases in response to a new distribution terminal ID with which the portable terminal apparatus 3 accesses, and finally, a plurality of distribution terminal TOCs are stored for each user ID.

6. Modifications

The foregoing description of the present embodiment proceeds on condition that the server 1 and a distribution terminal apparatus 2 commonly have a first TOC and the distribution terminal apparatus 2 and a portable terminal apparatus 3 commonly have a second TOC. However, it is also possible for the server 1, distribution terminal apparatus 2 and portable terminal apparatus 3 to have a single common TOC as a developed form.

FIGS. 13A to 13D illustrate a concept of, for example, such a TOC as just described.

Also in this instance, similarly as in the TOCs illustrated in FIGS. 9A, 9B and 9C, actual addresses of those of contents data stored in the storage section 102 of the server 1 which can be accessed by the portable terminal apparatus 3 or the distribution terminal apparatus 2 are indicated in FIG. 13A, and actual addresses of contents data stored in the storage area (storage section 208) of the distribution terminal apparatus 2 are indicated in FIG. 13B. Further, actual addresses of contents data stored in the storage area (storage section 320) of the portable terminal apparatus 3 are indicated in FIG. 13C.

In this instance, the TOC is formed from the server TOC, distribution terminal TOC and portable terminal TOC as seen in FIG. 13D. Here, the server TOC, distribution terminal TOC and portable terminal TOC have contents similar to those described hereinabove with reference to FIGS. 9D and 9E. The TOC is commonly possessed by the server 1, distribution terminal apparatus 2 and portable terminal apparatus 3.

An example of structure of the TOC is shown in FIG. 14.

Referring to FIG. 14, also in the TOC shown, since it is unique to each user which is specified by its user ID, the user ID is placed at the top. Below the user ID, the server TOC, distribution terminal TOC and portable terminal TOC are placed.

In the server TOC, contents IDs of accessible contents stored in the server 1 and virtual addresses of the server 1 are placed in a coordinated relationship. Similarly, in the distribution terminal TOC, contents IDs of contents stored in the distribution terminal apparatus 2 and virtual addresses of the distribution terminal apparatus 2 are stored in a coordinated relationship, and in the portable terminal TOC, contents IDs of contents stored in the portable terminal apparatus 3 and virtual addresses of the portable terminal apparatus 3 are stored in a coordinated relationship.

Also where the TOC having such a structure as described above is possessed commonly by the server 1, distribution terminal apparatus 2 and portable terminal apparatus 3, for example, upon downloading of contents data, each apparatus can access contents stored in the other apparatus, for example, in such a manner as described hereinabove with reference to FIG. 12. For example, the portable terminal apparatus 3 can access the storage section of the distribution terminal apparatus 2 or the server 1 in which contents are stored. Further, for example, also when the portable terminal apparatus 3 mutually communicates with the server 1 without the intervention of the distribution terminal apparatus 2, it can readily access contents stored in the server 1.

Since the TOCs possessed by the server 1, distribution terminal apparatus 2 and portable terminal apparatus 3 are updated in such a manner as described above, easy direct accessing which includes no search can be achieved.

In the TOCs possessed by the server 1, a distribution terminal TOC or a portable terminal TOC increases in response to a distribution terminal ID or a portable terminal ID with which the server 1 is accessed newly, and finally, a plurality of distribution terminal TOCs or a plurality of portable terminal TOCs are stored for each user ID.

In the TOCs possessed by the distribution terminal apparatus 2, a server TOC or a portable terminal TOC increases in response to a server ID with which the distribution terminal apparatus 2 accesses newly or a portable terminal ID with which the distribution terminal apparatus 2 is accessed newly, and finally, a plurality of server TOCs or a plurality of portable terminal TOCs are stored for each user ID.

In the TOCs possessed by the portable terminal apparatus 3, a distribution terminal TOC or a server TOC increases in response to a distribution terminal ID or a server ID with which the portable terminal apparatus 3 accesses newly, and finally, a plurality of server TOCs or distribution terminal TOCs are stored for each user ID.

In the present embodiment, a method of realizing a depositing process by rewriting processing of a TOC when contents data is deposited from the portable terminal apparatus 3 into the distribution terminal apparatus 2 or the server 1 is described. Alternatively, however, contents information may actually be moved from the portable terminal apparatus 3 to the distribution terminal apparatus 2 or the server 1.

Figure 15:
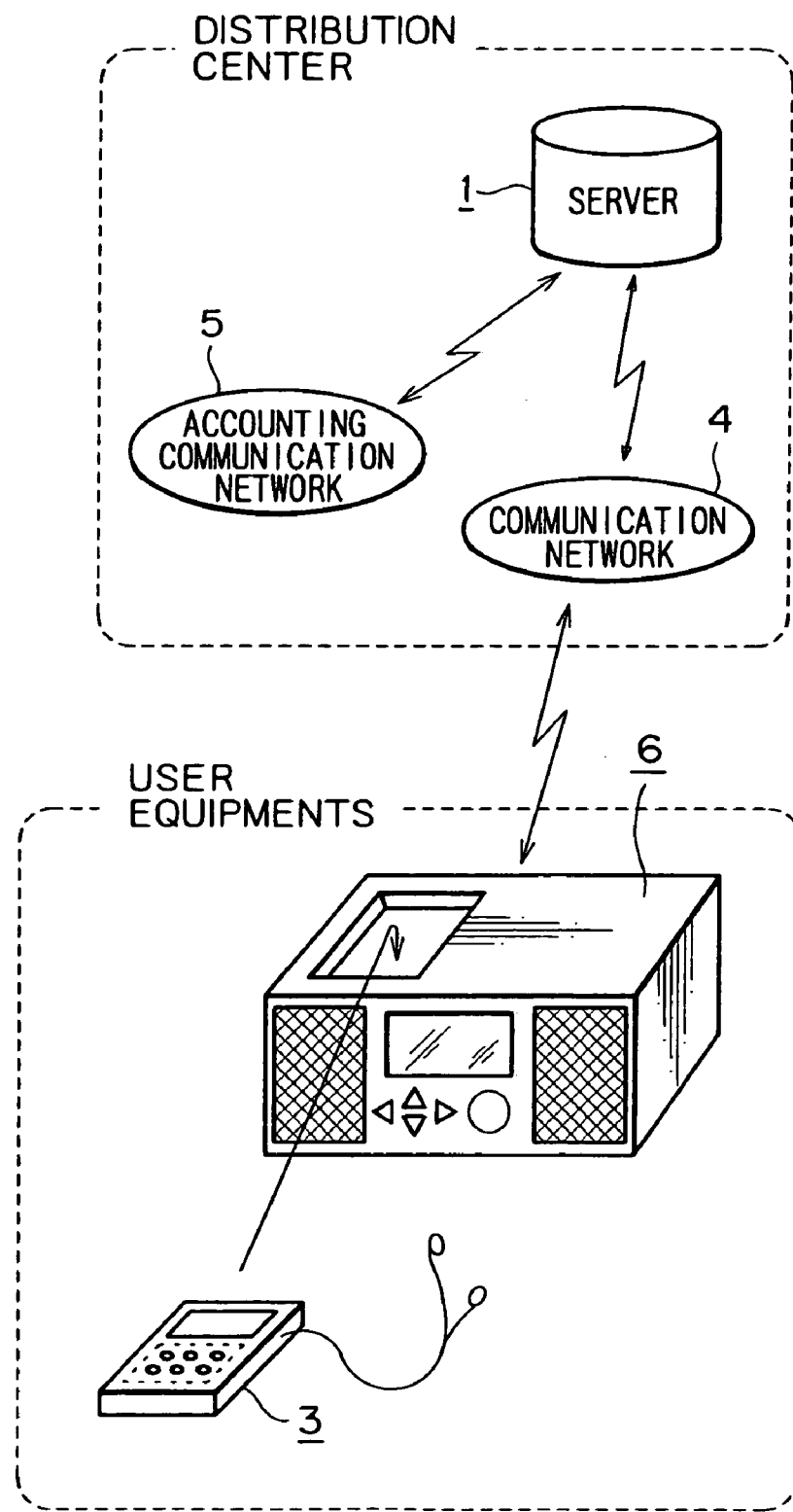
FIG. 15 is a schematic illustration showing an example of configuration of another data distribution system to which the present invention is applied.

A modification to the data distribution system of the present embodiment is shown in FIG. 15.

Referring to FIG. 15, the system shown includes, as equipments on the distribution center side, a server 1, an accounting communication network 5 and a communication network 4. The system further includes, as equipments on the user side, a recording and playback apparatus 6 in addition to a portable terminal apparatus 3.

The recording and playback apparatus 6 is formed, for example, as an apparatus of the stationary type and installed, for example, in a home of the user. The recording and playback apparatus 6 is connected to the communication network 4 to enable communication with the server 1. Consequently, a trade of a right of contents, incidental downloading of contents from the distribution center side and depositing/returning processing into/from a tune warehouse, which are performed between the distribution center side and the portable terminal apparatus 3 in the embodiment described hereinabove, can be performed between the server 1 and the recording and playback apparatus 6.

The recording and playback apparatus 6 allows the portable terminal apparatus 3 to be mounted thereon. The recording and playback apparatus 6 can communicate with the portable terminal apparatus 3 mounted thereon and, for example, can store contents downloaded from the server 1 and stored in the recording and playback apparatus 6 into the portable terminal apparatus 3 in such a manner as to move to the portable terminal apparatus 3. Also it is possible to conversely transfer and store contents stored in the portable terminal apparatus 3 to and into the recording and playback apparatus 6 in such a manner as to move to the recording and playback apparatus 6.

It is to be noted that the reason why the transfer between the recording and playback apparatus 6 and the portable terminal apparatus 3 is not copying but movement is that it is intended to prevent the downloaded contents from being duplicated by the user side thereby to infringe upon the copyright of the tune of the contents.

Also it is to be noted that, for example, if the processing illustrated in FIGS. 6 to 8 is applied to the present system, the processing of the distribution center side is executed by the server 1 while the processing of the user side is executed by the recording and playback apparatus 6.

Also such a system as just described can be configured so as to have a TOC similar to that described hereinabove with reference to FIGS. 9A to 9E, 10 and 11. In particular, a first TOC composed of a TOC for managing contents stored in the server 1 and another TOC for managing contents stored in the recording and playback apparatus 6 is stored in the server 1 and the recording and playback apparatus 6, and a second TOC composed of a TOC for managing the contents stored in the recording and playback apparatus 6 and another TOC for managing the contents stored in the portable terminal apparatus 3 is stored in the recording and playback apparatus 6 and the portable terminal apparatus 3.

Alternatively, a single TOC composed of a set of TOCs for managing contents stored in the server 1, recording and playback apparatus 6 and portable terminal apparatus 3 similar to that described hereinabove with reference to FIGS. 13A to 13D and 14 may be stored in each of the server 1, recording and playback apparatus 6 and portable terminal apparatus 3. This makes it possible for each of the server 1, recording and playback apparatus 6 and portable terminal apparatus 3 to access contents stored in the storage section of an object apparatus.

It is to be noted that the present invention is not limited to the embodiment described hereinabove and allows various modifications or alterations. For example, the data distribution system may have a different apparatus configuration from those shown in FIGS. 1 and 15. Further, also the data as contents to be distributed by the data distribution system is not limited to data principally including audio data as a tune, but various data may be used including, for example, software for a game, video data and text data of a writing such as a novel.

What is claimed is:

1. A terminal apparatus for receiving content information from a distribution apparatus, comprising:

storage means for storing a plurality of pieces of said content information;

communication means for receiving a plurality of content IDs stored in said distribution apparatus from said distribution apparatus and transmitting at least one said content ID to said distribution apparatus in response to a user request;

selection means for selecting one content ID of said plurality of content IDs received by said communication means; and control means for controlling said communication means to transmit said at least one content ID to said distribution apparatus in response to said user request and storing addresses corresponding to said content IDs received from said distribution apparatus into said storage means, wherein said control means controls said communication means to transmit said addresses stored in said storage means to said distribution apparatus such that said communication means receives said content information associated with said addresses from said distribution address at any time said terminal apparatus requests said content information corresponding to said content ID from said distribution apparatus after storing said addresses received from said distribution apparatus into said storage means;

said control means controls said communication means to transmit said content ID selected by said selection means to said distribution apparatus; and said addresses include logical addresses, each logical address corresponding to a predetermined physical address of a storage medium provided in said distribution apparatus at which said content information received in response to said user request by said communication means is stored into said storage means.

2. The terminal apparatus according to claim 1, wherein said logical address is included in a piece of management information which is used commonly by said distribution apparatus and said terminal apparatus.

3. The terminal apparatus according to claim 2, wherein said control means extracts said logical address included in said management information corresponding to content ID in response to said user request, and transmits said logical address to said distribution apparatus.

* * * * *